(12) United States Patent
Fallon et al.

(10) Patent No.: US 9,521,050 B2
(45) Date of Patent: Dec. 13, 2016

(54) METHOD OF AND DEVICE FOR SERVICE MONITORING AND SERVICE MONITORING MANAGEMENT

(75) Inventors: Liam Fallon, Athlone (IE); Yangcheng Huang, Athlone (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 552 days.

(21) Appl. No.: 13/995,714

(22) PCT Filed: Dec. 20, 2010

(86) PCT No.: PCT/EP2010/070321
§ 371 (c)(1),
(2), (4) Date: Sep. 13, 2013

(87) PCT Pub. No.: WO2012/084009
PCT Pub. Date: Jun. 28, 2012

(65) Prior Publication Data
US 2014/0006612 A1    Jan. 2, 2014

(51) Int. Cl.
*H04L 12/26* (2006.01)
*H04L 12/24* (2006.01)

(52) U.S. Cl.
CPC ........... *H04L 43/00* (2013.01); *H04L 12/2602* (2013.01); *H04L 41/065* (2013.01); *H04L 41/5032* (2013.01); *H04L 41/5035* (2013.01)

(58) Field of Classification Search
None
See application file for complete search history.

(56) References Cited

U.S. PATENT DOCUMENTS

2005/0089043 A1*  4/2005  Seckin ............... H04L 41/5006
                                                   370/395.21
2010/0150014 A1*  6/2010  Oda .................... H04L 43/026
                                                   370/252

(Continued)

FOREIGN PATENT DOCUMENTS

WO    WO 2005/022852     3/2005
WO    WO 2009/015461     2/2009

(Continued)

OTHER PUBLICATIONS

3GPP: 3GPP TS 26.234 V6.0.0 3$^{rd}$ Generation Partnership Project: Technical Specification GHroup Services and System Aspects; Transparent end-to-end Packet-switched Streaming Service (PSS); 3GPP TS 26.234 V6.0.0, (Jun. 1, 2004), 94 pages.

(Continued)

*Primary Examiner* — Natisha Cox
(74) *Attorney, Agent, or Firm* — Boisbrun Hofman, PLLC

(57) ABSTRACT

The invention relates to a method of and device for service monitoring and a method of and device for service monitoring management. In particular the invention relates to a method of and device for service monitoring of at least one service, and of at least one sub-service associated with the service in which values for service monitoring metric and sub-service monitoring metrics derived from the terminal operational information are monitored and recorded. One or more service monitoring reports, containing service monitoring metric values and sub-service monitoring metric values that are relationally organized to reflect the association between the sub-service and the service, are sent. The invention also relates to a method of and device for service monitoring management in which one or more service monitoring reports, having service monitoring metric values and sub-service monitoring metric values that are relationally organized to reflect the association between the sub- (Continued)

service and the service, are received and stored. The received service monitoring metric values and sub-service monitoring metric values are analyzed with reference to the association between the service and the sub-service to perform service monitoring management. The service monitoring of the claimed invention may be carried out in a terminal or in a proxy or agent service monitoring device.

29 Claims, 21 Drawing Sheets

(56) References Cited

U.S. PATENT DOCUMENTS

| | | | |
|---|---|---|---|
| 2010/0195503 A1* | 8/2010 | Raleigh | H04W 28/0268 370/235 |
| 2010/0332906 A1* | 12/2010 | Agrawal | H04L 41/0631 714/37 |
| 2011/0044291 A1* | 2/2011 | Omar | H04W 60/04 370/332 |
| 2011/0161484 A1* | 6/2011 | Van den Bogaert | H04L 43/0876 709/224 |
| 2011/0273995 A1* | 11/2011 | Ahn | H04L 41/5003 370/241 |
| 2012/0041858 A1* | 2/2012 | Lewis | G06Q 10/04 705/34 |
| 2013/0325551 A1* | 12/2013 | Rosenberg | G06Q 30/0202 705/7.31 |
| 2013/0326551 A1* | 12/2013 | Chatterjee | H04W 24/10 725/9 |
| 2014/0149573 A1* | 5/2014 | Tofighbakhsh | H04L 41/5067 709/224 |

FOREIGN PATENT DOCUMENTS

| | | |
|---|---|---|
| WO | WO 2010/069372 | 6/2010 |
| WO | 2012/052053 A1 | 4/2012 |

OTHER PUBLICATIONS

3GPP TS 26.114 V9.3.0, Technical Specification; $3^{rd}$ Generation Partnership Project; Technical Specification Group Services and System Aspects; IP Multimedia Subsystem (IMS); Multimedia Telephony; Media Handling and Interaction (Release 9) (Jun. 2010).
Broadband Forum Technical Report TR-106, "Data Model Template for TR-069-Enabled Devices", Issue: 1 Amendment 4; Issue Date: Feb. 2010.
Broadband Forum Technical Report TR-069, "CPE WAN Management Protocol v1.1", Version: Issue 1 Amendment 2; Version Date: Dec. 2007.
Westerlund et al, "SDP and RTSP Extensions Defined for 3GPP Packet-Switched Streaming Service and Multimediia Broadcast/Multicast Service" Network Working Group Internet Draft, May 8, 2009.
3GPP TS 26.234 V9.3.0, Technical Specification; $3^{rd}$ Generation Partnership Project; Technical Specification Group Services and System Aspects; Transparent End-to-End Packet-Switched Streaming Service (PSS); Protocols and codecs (Release 9) (Jun. 2010).
RFC 3611, Friedman, et al, RTP Control Protocol Extended Reports (RTCP XR), Nov. 2003.
RFC 3550, Schulzrinne et al, "RTP: A Transport Protocol for Real-Time Applications", Jul. 2003.
Broadband Forum, Technical Report, TR-135; "Data Model for a TR-069 Enabled STB;" Version: Issue 1, Version Date: Dec. 2007.
Broadband Forum, Technical Report, TR-160; "IPTV Performance Monitoring;" Issue: 1; Issue Date: Nov. 2010.

* cited by examiner

| SERVICE_MONITORING_PARAMETERS Message | |
|---|---|
| Generic Parameters | |
| Generic_Parameter_1 | Non service specific parameter 1 |
| Generic_Parameter_2 | Non service specific parameter 2 |
| - - - | - - - - - - - |
| Generic_Parameter_Z | Non service specific parameter Z |
| No_SERVICES | Number of services for which parameters are specified in this message |

| Parameters for Service 1 | |
|---|---|
| SERVICE1_ID | ID of first service for which parameters are specified |
| WAIT_PERIOD | Period to wait between status reports for this service |
| Metric1_Parameters | Threshold, range, and timers for Metric 1 of this service |
| Metric2_Parameters | Threshold, range, and timers for Metric 2 of this service |
| - - - | - - - - - - - |
| MetricN_Parameters | Threshold, range, and timers for Metric N of this service |
| No_SUBSERVICES | Number of sub-services of service 1 for which parameters are specified |

| Parameters for Sub-Service 1 | |
|---|---|
| SS1Metric1_Parameters | Threshold, range, and timers for Metric 1 of this sub-service |
| SS1Metric2_Parameters | Threshold, range, and timers for Metric 2 of this sub-service |
| - - - | - - - - - - - |
| SS1MetricN_Parameters | Threshold, range, and timers for Metric N of this sub-service |

| Parameters for Sub-Service 2 | |
|---|---|
| SS2Metric1_Parameters | Threshold, range, and timers for Metric 1 of this sub-service |
| SS2Metric2_Parameters | Threshold, range, and timers for Metric 2 of this sub-service |
| - - - | - - - - - - - |
| SS2MetricN_Parameters | Threshold, range, and timers for Metric N of this sub-service |

Figure 3

| SERVICE_QUALITY_REPORT Messages ||
|---|---|
| Generic Metrics ||
| REPORT_ID | Unique identifier of the report message |
| SESSION_ID | ID of the service session |
| REPORT_TYPE | Start, Termination, Status Update |
| TIMESTAMP | Time of generation of the report |
| LOCATION | Geographical location of the terminal |
| TERMINAL_ID | ID of the terminal |
| TERMINAL_ADDRESS | Address of the terminal |
| TERMINAL_NAME | Name of the terminal |
| USER_ID | ID of the user |
| USER_NAME | Name of the user |
| RESULT | Session or sub-session termination successful or not |
| ERROR_CODE | Error code for abnormally terminating sessions or sub-sessions |
| ERROR_MESSAGE | Error message for abnormally terminating sessions or sub-sessions |
| Generic_Metric_P | Other non-service specific metric |
| - - - | - - - - - - - |
| Generic_Metric_Z | Other non-service specific metric |
| No_SERVICES | Number of services for which metrics are reported in this message |

| Metrics for Service 1 ||
|---|---|
| SERVICE1_ID | ID of the service |
| Metric1_Values | Values for metric 1 |
| - - - | - - - - - - - |
| MetricN_Values | Values for metric N |
| No_SUBSERVICES | Number of sub-services of service 1 for which metrics are reported |

| Metrics for Sub-Service 1 ||
|---|---|
| SS1Metric1_Values | Values for sub-service 1 metric 1 |
| - - - | - - - - - - - |
| SS1MetricN_Values | Values for sub-service 1 metric n |

| Metrics for Sub-Service 2 ||
|---|---|
| SS2Metric1_Values | Values for sub-service 2 metric 1 |
| - - - | - - - - - - - |
| SS2MetricN_Values | Values for sub-service 2 metric N |

| Metrics for IPTV | | | |
| --- | --- | --- | --- |
| SERVICE_ID | ID of the service | UINT | IPTV |
| SERVICE_ACCESS_TIME | Average time to access the IPTV service | UINT | Milliseconds |
| SERVICE_ACCESSES | Number of IPTV accesses performed | UINT | |
| FAILED_SERVICE_ACCESSES | Number of IPTV accesses that failed | UINT | |
| DOWNLOAD_THROUGHPUT | Total throughput on download | UINT | Kb/s |
| UPLOAD_THROUGHPUT | Total throughput on upload | UINT | Kb/s |
| PKTLOSS | Packet loss as a percentage of total packets | FLOAT | [0..1] |
| LATENCY | Average round trip time for Packets | UINT | Milliseconds |
| PORTAL_RETRIEVAL_TIME | Average time to retrieve information from IPTV portal | UINT | Milliseconds |
| MEDIA_QUALITY | A MOS estimation of media quality | FLOAT | |1..5| |
| DUPLICATE_RTP_PKTS | Number of duplicated RTP packets | UINT | |
| OUT_OF_ORDER_RTP_PKTS | Number of out of order RTP packets | UINT | |
| LOST_RTP_PKTS | Number of lost RTP packets | UINT | |
| AVG_RTP_LOSS_PERIOD | The average RTP loss period | UINT | |
| AVG_RTP_JITTER | Average RTP jitter | UINT | |
| STDDEV_RTP_JITTER | Standard deviation of RTP jitter | FLOAT | |
| No_SUBSERVICES | Number of sub-services of IPTV | UINT | 0-2 |

| Metrics for TV Channel Sub-Service | | | |
| --- | --- | --- | --- |
| CHANNEL_ID | ID of the channel | UINT | |
| SUB_SERVICE_NAME | The name of the channel | UINT | |
| SUB_SERVICE_ACCESS_TIME | Time to access the channel | UINT | Milliseconds |
| SUB_SERVICE_ACCESSES | Number of channel accesses performed | | |
| FAILED_SUB_SERVICE_ACCESSES | Number of channel accesses failed | | |
| CHANNEL_SWITCH_TIME | Average time to switch channels | UINT | Milliseconds |
| CHANNEL_CONTROL_TIME | Time for channel playout command execution | UINT | Milliseconds |
| TRAFFIC_UL | Uplink Traffic for this channel | UINT | Kb/s |
| TRAFFIC_DL | Downlink Traffic for this channel | UINT | Kb/s |

| Metrics for Content on Demand Sub-Service | | | |
| --- | --- | --- | --- |
| CONTENT_ADDRESS | Address of Content for sub-service session | STRING | |
| SUB_SERVICE_NAME | Descriptive name of the content | STRING | |
| SUB_SERVICE_ACCESS_TIME | Time to access content on demand | UINT | Milliseconds |
| SUB_SERVICE_ACCESSES | Number of COD accesses performed | | |
| FAILED_SUB_SERVICE_ACCESSES | Number of COD accesses failed | | |
| COD_CONTROL_TIME | Time for COD playout command to be executed | UINT | Milliseconds |
| TRAFFIC_UL | Uplink Traffic for this content on demand service | UINT | Kb/s |
| TRAFFIC_DL | Downlink Traffic for this content on demand service | UINT | Kb/s |

Figure 5a

| Metrics for Web Browsing | | | |
|---|---|---|---|
| SERVICE_ID | ID of the service | UINT | WEB_BROWSING |
| SERVICE_ACCESS_TIME | Average time to access a web site | UINT | Milliseconds |
| SERVICE_ACCESSES | Number of web accesses performed | UINT | |
| FAILED_SERVICE_ACCESSES | Number of web accesses that failed | UINT | |
| DOWNLOAD_THROUGHPUT | Total throughput on download | UINT | Kb/s |
| UPLOAD_THROUGHPUT | Total throughput on upload | UINT | Kb/s |
| PKTLOSS | Packet loss as a percentage of total packets | FLOAT | [0..1] |
| LATENCY | Average round trip time for Packets | UINT | Milliseconds |
| No_SUBSERVICES | Number of sub-services of Web Browsing | UINT | 0-n |

| Metrics for Web Browsing to Specific URL Sub-Service | | | |
|---|---|---|---|
| URL_ADDRESS | URL for this sub-service | STRING | |
| SUB_SERVICE_NAME | Descriptive name of the web site | STRING | |
| SUB_SERVICE_ACCESS_TIME | Average time to access web Site | UINT | Milliseconds |
| SUB_SERVICE_ACCESSES | Number of web accesses performed | | |
| FAILED_SUB_SERVICE_ACCESSES | Number of web accesses that failed | | |
| TRAFFIC_UL | Uplink Traffic for this web site | UINT | Kb/s |
| TRAFFIC_DL | Downlink Traffic for this web site | UINT | Kb/s |

Figure 5b

| Metrics for Telephony | | | |
|---|---|---|---|
| SERVICE_ID | ID of the service | UINT | TELEPHONY |
| SERVICE_ACCESS_TIME | Average time to start a telephony session | UINT | Milliseconds |
| SERVICE_ACCESSES | Number of telephony sessions performed | UINT | |
| FAILED_SERVICE_ACCESSES | Number of telephony sessions that failed | UINT | |
| DOWNLOAD_THROUGHPUT | Total throughput on download in the measuring period | UINT | Kb/s |
| UPLOAD_THROUGHPUT | Total throughput on upload in the measuring period | UINT | Kb/s |
| PKTLOSS | Packet loss as a percentage of total packets | FLOAT | [0..1] |
| LATENCY | Average round trip time for Packets | UINT | Milliseconds |
| MEDIA_QUALITY | A MOS estimation of media quality | UINT | P.800 MOS Estimation |

Figure 5c

| Metrics for M2M | | | |
|---|---|---|---|
| SERVICE_ID | ID of the service | UINT | VPN |
| SERVICE_ACCESS_TIME | Average time to access a M2M service | UINT | Milliseconds |
| SERVICE_ACCESSES | Number of M2M service accesses performed | UINT | |
| FAILED_SERVICE_ACCESSES | Number of M2M service accesses that failed | UINT | |
| DOWNLOAD_THROUGHPUT | Total throughput on download | UINT | Kb/s |
| UPLOAD_THROUGHPUT | Total throughput on upload | UINT | Kb/s |
| PKTLOSS | Packet loss as a percentage of total packets | FLOAT | [0..1] |
| LATENCY | Average round trip time for Packets | UINT | Milliseconds |
| No_SUBSERVICES | Number of sub-services of M2M service | UINT | 0-n |

| Metrics for M2M Sub-Services | | | |
|---|---|---|---|
| ADDRESS | Address for this M2M service | STRING | |
| SUB_SERVICE_NAME | Descriptive name of the M2M Service | STRING | |
| SUB_SERVICE_ACCESS_TIME | Average time to access the M2M Service | UINT | Milliseconds |
| SUB_SERVICE_ACCESSES | Number of M2M Service accesses performed | | |
| FAILED_SUB_SERVICE_ACCESSES | Number of M2M Service accesses that failed | | |
| TRAFFIC_UL | Uplink Traffic for this M2M service | UINT | Kb/s |
| TRAFFIC_DL | Downlink Traffic for this M2M service | UINT | Kb/s |

Figure 5d

| Metrics for VPN |||||
|---|---|---|---|---|
| SERVICE_ID | ID of the service | UINT | VPN |
| SERVICE_ACCESS_TIME | Average time to access a VPN | UINT | Milliseconds |
| SERVICE_ACCESSES | Total number of VPN accesses performed | UINT | |
| FAILED_SERVICE_ACCESSES | Total number of VPN accesses that failed | UINT | |
| DOWNLOAD_THROUGHPUT | Total throughput on download for all VPNs | UINT | Kb/s |
| UPLOAD_THROUGHPUT | Total throughput on upload for all VPNs | UINT | Kb/s |
| PKTLOSS | Packet loss as a percentage of total packets | FLOAT | [0..1] |
| LATENCY | Average round trip time for Packets | UINT | Milliseconds |
| No_SUBSERVICES | Number of VPNs being monitored | UINT | 0-n |

| Metrics for VPN Sub-Services ||||
|---|---|---|---|
| ADDRESS | Address for this VPN | STRING | |
| SUB_SERVICE_NAME | Descriptive name of the VPN | STRING | |
| SUB_SERVICE_ACCESS_TIME | Average time to access the VPN | UINT | Milliseconds |
| SUB_SERVICE_ACCESSES | Number of VPN accesses performed | | |
| FAILED_SUB_SERVICE_ACCESSES | Number of VPN accesses that failed | | |
| TRAFFIC_UL | Uplink Traffic for this VPN | UINT | Kb/s |
| TRAFFIC_DL | Downlink Traffic for this VPN | UINT | Kb/s |

Figure 5e

METHOD OF AND DEVICE FOR SERVICE MONITORING AND SERVICE MONITORING MANAGEMENT

This application is the U.S. national phase of International Application No. PCT/EP2010/070321, filed 20 Dec. 2010, which designated the U.S., the entire contents of which is hereby incorporated by reference.

TECHNICAL FIELD

The invention relates to a method of and device for service monitoring and a method of and device for service monitoring management.

BACKGROUND

It is desirable in many situations to monitor the quality of service of a service. One way of providing quality of service monitoring is to monitor the service at the point where that service is delivered, i.e. at the terminal that is running a service. In such situations, in general service quality metrics are measured at the terminal and are reported to an entity in the network that records and collates those measurements centrally.

Many different methods for service quality reporting for terminals have been proposed. For example, Real-time Transport Control Protocol (RTCP) and RTP Control Protocol eXtended Reports (RTCP XR) may be used for quality reporting on RTP based streaming services. Quality of Experience (QoE) reporting mechanisms are also specified in 3GPP TS 26.346, for example. Moreover, the Broadband Forum TR-069 specifies a protocol for communication between an Auto-Configuration Server (ACS) and Customer Premise Equipment (CPE). The Auto-Configuration Server (ACS) is a server within the service provider's network that has the ability to control and monitor a Customer Premise Equipment (CPE) with the Broadband Forum TR-069 protocol.

The present invention seeks to provide a method of and a device for service monitoring and of service monitoring management that alleviates at least some of the disadvantages of the prior art.

SUMMARY

In accordance with one aspect of the invention there is provided a method of service monitoring comprising the steps of receiving a service monitoring request to perform service monitoring of at least one service, and of at least one sub-service associated with the service, in a terminal. For the or each service to be monitored the method comprises the steps of monitoring terminal operational information; recording at least one value for a service monitoring metric and/or a sub-service monitoring metric derived from the terminal operational information. The method further comprises sending one or more service monitoring reports in respect of a service, wherein service monitoring metric values and sub-service monitoring metric values within the or each service monitoring report are relationally organised reflecting the association between the sub-service and the service.

In accordance with a second aspect of the invention there is provided a device for service monitoring. The device comprises a receiver coupled to receive a service monitoring request to perform service monitoring of at least one service, and of at least one sub-service associated with the service, in a terminal; a monitor operable to connect with a terminal operational information store and to monitor terminal operational information in the terminal operational information store. The device further comprises a record manager coupled to the monitor and to a metrics record and operable to record at least one value for a service monitoring metric and/or a sub-service monitoring metric derived from the terminal operational information in the metrics record; and a reporter coupled to the metrics record. The reporter is operable to send one or more service monitoring reports in respect of a service, wherein service monitoring metric values and sub-service monitoring metric values within the or each service monitoring report are relationally organised reflecting the association between the sub-service and the service.

In accordance with a third aspect of the invention there is provided a method of service monitoring management comprising the steps of: receiving one or more service monitoring reports in respect of a service, wherein service monitoring metric values and sub-service monitoring metric values within the or each service monitoring report are relationally organised to reflect the association between the sub-service and the service. The method also comprises storing received service monitoring metric values and sub-service monitoring metric values in a relationally organised manner reflecting the association between the sub-service and the service; and performing service monitoring management by analysing the received service monitoring metric values and sub-service monitoring metric values with reference to the association between the service and the sub-service.

In accordance with a fourth aspect of the invention there is provided a device for service monitoring management. The device comprises a monitoring report receiver element operable to receive one or more service monitoring reports in respect of a service, wherein service monitoring metric values and sub-service monitoring metric values within the or each service monitoring report are relationally organised to reflect the association between the sub-service and the service. The device also comprises a storage element arranged to store service monitoring metric values and sub-service monitoring metric values in a relationally organised manner reflecting the association between the sub-service and the service and a received metric value storing element coupled to the monitoring report receiver element to receive service monitoring metric values and sub-service monitoring metric values there from and coupled to the storage element. The received metric value storing element is operable to store received service monitoring metric values and sub-service monitoring metric values in the storage element in a relationally organised manner reflecting the association between the sub-service and the service. The device further comprises a records analyser coupled to the storage element and operable to perform service monitoring management by analysing the received service monitoring metric values and sub-service monitoring metric values with reference to the association between the service and the sub-service.

BRIEF DESCRIPTION OF THE DRAWINGS

The invention will now be described by way of example with reference to the accompanying drawings:

FIG. 3 shows an exemplary service_monitoring_parameters message;

FIG. 4 shows an exemplary service_quality_report message;

FIG. 5 a-e show respective exemplary service specific metrics for a number of different services;

DETAILED DESCRIPTION

In the following description of embodiments of the invention, reference will be made to sessions of services and sub-services running on a terminal.

In this description, a terminal is a device on which services can be run. A terminal may be dedicated to running a single service, for example a terminal may be a set top box. A terminal may be capable of running a plurality of services, for example the terminal may be a computer or a smart phone. Such a terminal may have an application client stored in memory, and a service can be provided to the user of the terminal by interaction of an active application client on the terminal and a remote application server.

A service may have one or more associated or related sub-services, which rely on the operation of the service. Services and their corresponding sub-services are exemplified by, but not limited to:
  an IPTV service may have: TV channel sub-service; Content on Demand sub-service;
  a web service may have: web-mail sub-service; access to individual web-sites sub-service;
  a telephony service;
  a M2M service may have: sub-service for individual M2M service;
  a VPN service might have: sub-service for individual VPN service.

A session of a service is defined as an occurrence of the service. A session of a service spans the time from the initiation of the service to the time that the service has terminated. A session of a sub-service spans the time from the initiation of the sub-service to the time that the sub-service has terminated.

A single session for a service may have a number of sub-service sessions within the single service session. Thus for example, within a single web browsing session, a number of different sub-service sessions, such as a web-mail sub-service session or a number of different web-site sub-service sessions, might be accommodated. In another example, a single IPTV service session might include a number of different channel sub-service sessions and/or content on demand sub-service sessions. It will be clear that sub-service sessions may occur sequentially and/or simultaneously within a single service session, and that typically one or more service sessions may occur simultaneously in one terminal.

Although only service sessions and sub-service sessions are discussed in this document, the skilled person will be able to extend the principles described herein to further sub-levels of service sessions, and all such further iterations are intended to be included within the scope of the invention.

Figure 1:
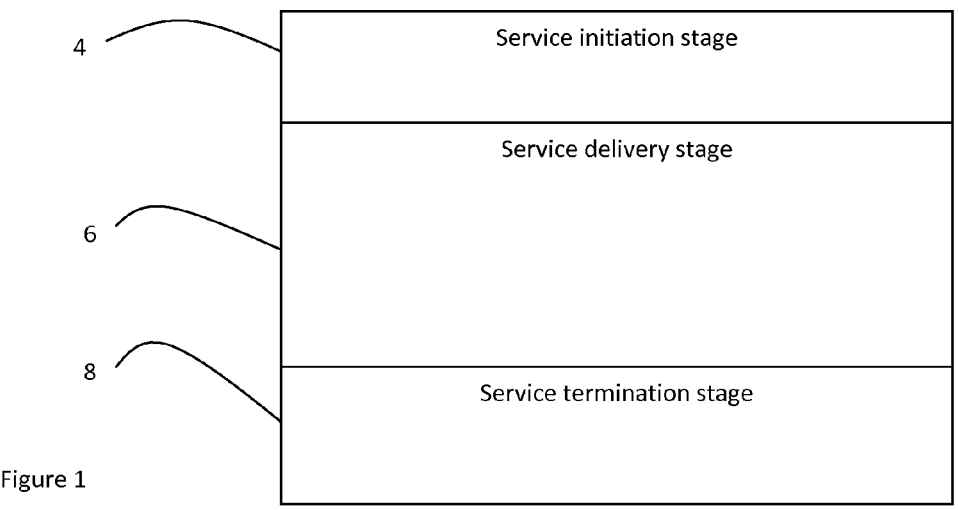
FIG. 1 illustrates three stages of operation of a session 2 of a service or a sub-service.

FIG. 1 illustrates three stages of operation of a session 2 of a service or a sub-service.

The first stage of operation of a session 2 is the service initiation stage 4. This stage is a preliminary set up stage, and in this stage signalling messages are exchanged with the service provider, such as the applications server or a media server, in order to establish the session, for example to establish an operational service connection for service delivery.

Once the signalling is complete and an operational service connection is established, the service delivery stage 6 of session 2 begins. In this stage, the service is actually being delivered to the terminal.

The third stage is a service termination stage 8 of session 2. In some service sessions this stage may be cut short or abandoned. However, in general during termination of a service, signalling will be exchanged with the service provider to tear down the channel used for the service.

Embodiments of the invention will now be described with reference to FIGS. 2-18.

Figure 2:
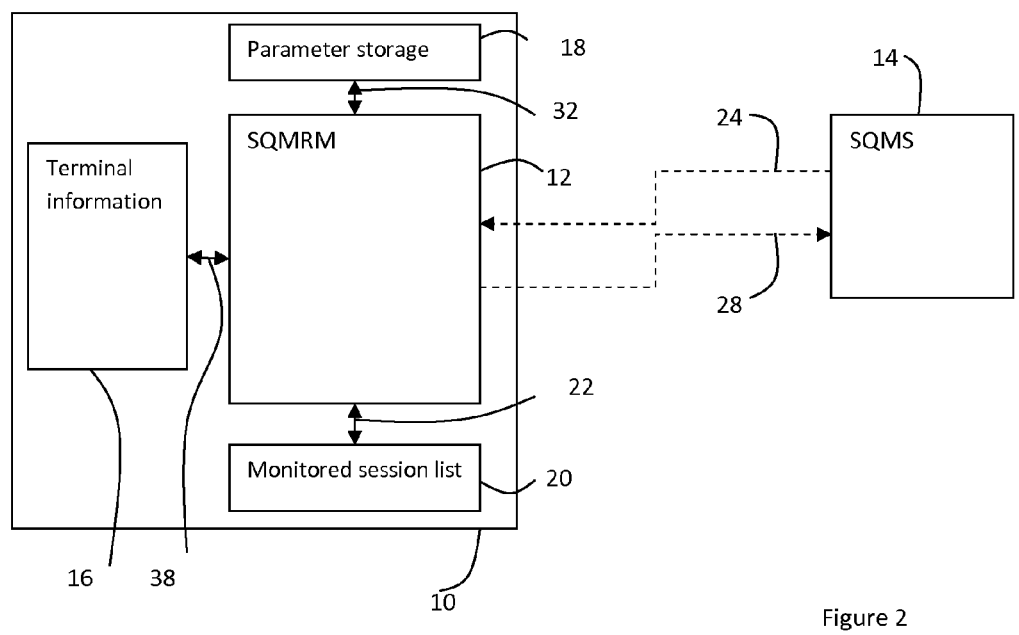
FIG. 2 is a schematic diagram showing one embodiment of the invention.

In FIG. 2 a terminal 10 is provided with a Service Quality Monitoring and Reporting Module (SQMRM) 12. The Service Quality Monitoring and Reporting Module (SQMRM) 12 monitors the quality of service for services operating on terminal 10 under the direction of a Service Quality Management System (SQMS) 14.

It will be clear to a skilled person that a Service Quality Monitoring and Reporting Module (SQMRM) 12 may be provided for each service to be monitored. One way in which this might be achieved is if the Service Quality Monitoring and Reporting Module (SQMRM) 12 is part of the application code providing the service, for example is provided as a plug-in for a browser. In this case the Service Quality Management System (SQMS) 14 will instruct a Service Quality Monitoring and Reporting Module (SQMRM) 12 associated with a single service to monitor that service.

In other embodiments, a single Service Quality Monitoring and Reporting Module (SQMRM) 12 may be instructed to monitor a number of services in the terminal 10. In addition, as will be seen later with reference to FIGS. 13 and 14, in other embodiments a Service Quality Monitoring and Reporting Module (SQMRM) 12 may be instructed to monitor a plurality of services on a plurality of terminals 10.

The terminal 10 is provided with terminal information storage 16 in which is stored operational information generated by the operation of terminal 10. The operational information includes information such as: packet latency; packet jitter; throughput information; time to access channel; number of successful/unsuccessful channel accesses, for example. Other information relating to the terminal or the user, such as terminal temperature; location of the terminal; user identification information may also be stored in the terminal information storage (16).

This operational information includes information that may be useful in analysing the quality of one or more services being run on the terminal 10. The Service Quality Monitoring and Reporting Module (SQMRM) 12 is coupled to the terminal information storage 16 and is operable to access the terminal information stored therein.

The Service Quality Monitoring and Reporting Module (SQMRM) 12 is also provided with a metric parameter storage 18, for storing generic metric parameters and for storing service metric parameters for the or each service that the Service Quality Monitoring and Reporting Module (SQMRM) 12 has received instructions to monitor. The Service Quality Monitoring and Reporting Module (SQMRM) 12 is coupled to the metric parameter storage 18 and operable to store parameters for metrics therein. The Service Quality Monitoring and Reporting Module (SQMRM) 12 is operable to access parameters for metrics from the metric parameter storage 18.

The Service Quality Monitoring and Reporting Module (SQMRM) 12 is also provided with a monitored session list storage 20, for storing a monitored session list identifying all active sessions of services for which monitoring instructions have been received by the Service Quality Monitoring and Reporting Module (SQMRM) 12. Service metrics values 22 for the or each service or sub-service for which a session is being monitored by the Service Quality Monitoring and Reporting Module (SQMRM) 12 can be stored for a monitored session in the monitored session list. Typically these service metric values 22 are terminal information 38 obtained from the terminal information store 16.

The Service Quality Monitoring and Reporting Module (SQMRM) 12 is coupled to the monitored session list storage 20 to manage a monitored session list in the monitored session list storage 20 and to store service metric values 22 for a monitored service session in the monitored session list.

In some embodiments, the metric parameter storage 18 and the monitored session list storage 20 may be part of the memory of the terminal 10 to which the Service Quality Monitoring and Reporting Module (SQMRM) 12 has access, while in other embodiments the Service Quality Monitoring and Reporting Module (SQMRM) 12 may be provided with its own memory.

The Service Quality Monitoring and Reporting Module (SQMRM) 12 is coupled to a Service Quality Management System (SQMS) 14 to receive a monitoring instruction message 24, instructing Service Quality Monitoring and Reporting Module (SQMRM) 12 to monitor one or more services running on terminal 10.

In some embodiments the monitoring instruction message 24 may be received by the Service Quality Monitoring and Reporting Module (SQMRM) 12 directly from the Service Quality Management System (SQMS) 14 or in other embodiments the monitoring instruction message 24 may be received indirectly from the Service Quality Management System (SQMS) 14 via other network elements, which are not shown in FIG. 2.

In embodiments the monitoring instruction message 24 contains parameters for generic metrics, to be reported by the Service Quality Monitoring and Reporting Module (SQMRM) 12. In some embodiments the monitoring instruction message 24 contains parameters for service metrics for use by the Service Quality Monitoring and Reporting Module (SQMRM) 12 in monitoring the service.

Metrics may relate to anything that can be measured and relate to measurements from which useful information about the quality of service being provided by the system can be deduced.

Generic metrics generally relate to identification information and/or quality monitoring process information. Service metrics generally relate to the operation or performance of the service or sub-service.

By including metric parameters in the monitoring instruction message 24 for a service, the Service Quality Management System (SQMS) 14 is able to select metrics that the Service Quality Monitoring and Reporting Module (SQMRM) 12 reports regarding the service.

By including parameters for metrics in the monitoring instruction message 24 for a service, the Service Quality Management System (SQMS) 14 is able to determine how the Service Quality Monitoring and Reporting Module (SQMRM) 12 monitors the metrics of interest.

In some embodiments it is not necessary to specify all metrics to be monitored for a particular service in a monitoring instruction message 24 received from the Service Quality Management System (SQMS) 14. In such an embodiment, on receipt of a monitoring instruction message 24 indicating a service is to be monitored, default metrics for that service and corresponding parameters for the default metrics and/or default sub-services and associated default sub-service metrics and corresponding parameters can be used by the Service Quality Monitoring and Reporting Module (SQMRM) 12 without specific instructions from the Service Quality Management System (SQMS) 14.

In such embodiments, the monitoring instruction message 24 may contain metrics and corresponding parameters additional to the default metrics and parameters. Alternatively or additionally sub-services and corresponding metrics additional to the default sub-services and/or alternative parameters for service metrics or sub service metrics may be specified in the monitoring instruction message 24.

In some embodiments a parameter specified for one or more of the metrics may relate to a threshold that notification is required if the metric value crosses the threshold. Thus for example a notification threshold for a monitoring metric might be set for 90% of the normal or expected value. In some embodiments a hysteresis range of, for example 2%, might be set to avoid flip-flop conditions. Therefore, if the value for the metric goes below 90% a service event is detected but the value for the metric must reach 92% before the service event is considered to have stopped. This is to avoid the situation where the metric value fluctuates around the threshold, resulting in many event notifications.

In some embodiments a parameter specified for one or more of the metrics may relate to the value of the metric. The typical case here could be monitoring of state data like on/off or busy/idle/blocked, or monitoring a channel name. For example, in some embodiments it may be desired to monitor only when a certain channel is being watched or a certain type of channel is being watched (e.g. pay per view channel)

In some embodiments a parameter specified for one or more of the metrics may relate to the range of the metric value. For example in some embodiments it may be desired to monitor a metric when its value is very low or very high. An example might be a generic metric that records the temperature of the terminal, where the temperature is to be recorded only if the temperature is outside an operating range. For example in one embodiment the temperature is to be recorded only if the temperature is less than −5 degrees Centigrade or greater than 30 degrees centigrade.

A parameter specified for a service might be a wait value defining the maximum period permitted between reports relating to that service.

In any event, in some embodiments, once monitoring of a service has been instructed, which in the exemplary embodiment occurs as a result of the receipt of a monitoring instruction message 24, a metric parameter record 26 for the service is formed in the metric parameter storage 18. The metric parameter record 26 may specify: the wait period, if any, defining the maximum period between monitoring report messages to be applied to the service; the service metrics to be used to monitor the service, together with any associated parameters such as range or threshold values; and sub-service metrics to be use to monitor sub-services of the service, together with any parameters associated with the sub-service metrics such as range or threshold values.

An example of a monitoring instruction message is shown in FIG. 3. The exemplary monitoring instruction message comprises:

a number of non-service specific generic parameters;
an indication of the number of services for which parameters are specified; and
service parameters for each service, together with its sub-services, included in the monitoring instruction message, the service parameters including:
a service identification;
a wait period parameter, defining the maximum wait period between status update reports for the service;
metric parameters for the service; and
an indication of number of sub-services for which parameters are specified: and
parameters for metrics for each of the sub-services defined for monitoring.

As will be apparent to a skilled person, one or more of the different parts of the monitoring instruction message shown in FIG. 3 may be omitted in different embodiments, and FIG. 3 is merely intended to be exemplary.

In turn the Service Quality Monitoring and Reporting Module (SQMRM) 12 is coupled to the Service Quality Management System (SQMS) 14 to return quality report message 28 to the Service Quality Management System (SQMS) 14, reporting values for service metric for the services for which quality of service monitoring has been requested.

Again, in some embodiments the quality report message 28 may be sent directly to the Service Quality Management System (SQMS) 14 from the Service Quality Monitoring and Reporting Module (SQMRM) 12, or in other embodiments the quality report message 28 may be sent indirectly to the Service Quality Management System (SQMS) 14 via other network elements, which are not shown in FIG. 2.

An example of a quality report message 28 is shown with reference to FIG. 4. The exemplary quality report message 28 comprises:

Generic metric values, including identification information and an indication of the report type;
an indication of the number of services for which metric values are included in the monitoring report message; and
service metric values for each service, together with sub-service metric values for its sub-services, included in the monitoring report message, the service metric values including:
a service identification; and
values for the service metrics; and
an indication of number of sub-services for which metrics values are supplied; and
values for metrics for each of the sub-services defined for monitoring.

Again, as will be apparent to a skilled person, one or more of the different parts of the monitoring report message shown in FIG. 4 may be omitted in different embodiments, and FIG. 4 is merely intended to be exemplary.

In addition to the generic metrics shown in FIGS. 3 and 4, additional generic metrics may relate to, for example, a generic metric relating to the service event triggering the sending of the report, for example whether the sending of the report message was triggered by a new service session; a new sub-service session; a elapse of a wait period; a metric threshold being exceeded by a metric value; a metric value dropping below a metric threshold; a sub-service session termination or a service session termination.

FIG. 5 *a-e* show respective exemplary service specific metrics for a number of different possible services.

An exemplary exchange of messages between the Service Quality Management System (SQMS) 14 and the Service Quality Monitoring and Reporting Module (SQMRM) 12 will be explained in outline with reference to FIG. 6. In this description it is assumed that the Service Quality Management System (SQMS) 14 both instructs the monitoring of the service by the Service Quality Monitoring and Reporting Module (SQMRM) 12, and receives the quality report messages 28 resulting from the monitoring. However, in some embodiments the quality report messages 28 may be sent to a different monitoring entity for analysis.

Firstly a SERVICE_MONITORING_PARAMETERS message 30 is sent from Service Quality Management System (SQMS) 14 to Service Quality Monitoring and Reporting Module (SQMRM) 12 as a monitoring instruction message 24 instructing the Service Quality Monitoring and Reporting Module (SQMRM) 12 to monitor quality of service metrics for at least one service. The SERVICE_MONITORING_PARAMETERS message 30 may contain parameters 32 for service metrics of at least one service for which quality of service monitoring is to be carried out, together with generic metric parameters.

As will be seen from a consideration of the following description the Service Quality Monitoring and Reporting Module (SQMRM) 12 stores the metric parameters 32 received by the Service Quality Monitoring and Reporting Module (SQMRM) 12 in the metric parameter storage 18 in step 34. The metric parameters 32 are used by the Service Quality Monitoring and Reporting Module (SQMRM) 12 in monitoring service sessions of monitored services.

In step 36 a session of a service for which service monitoring has been requested starts and the Service Quality Monitoring and Reporting Module (SQMRM) 12 creates an entry for the service session in the monitored session list in monitored session list storage 20. In some embodiments a session record is created for the service session when the start of a session is detected. During the service session, values for service metrics 22 are obtained from terminal information 38, using respective parameters as appropriate, and are stored in the monitored session list storage 20.

A SERVICE_SESSION_START message 40, containing values of metrics stored in monitored session list storage 20 for that service is sent back to Service Quality Management System (SQMS) 14 from Service Quality Monitoring and Reporting Module (SQMRM) 12 as a quality report message 28. In embodiments of the invention, the SERVICE_SESSION_START message 40 is sent back at the end of the service initiation stage of the service session, and contains values for service metrics for the service initiation stage of the service.

As the service session carries on, SERVICE_SESSION_UPDATE messages 42 and 44, containing values of metrics stored in the monitored session list storage 20 for that service, are sent from Service Quality Monitoring and Reporting Module (SQMRM) 12 to Service Quality Management System (SQMS) 14 as quality report messages 28. In some embodiments the SERVICE_SESSION_UPDATE messages 42 and 44 are sent in response to a session event detected by the Service Quality Monitoring and Reporting Module (SQMRM) 12 at step 46 and step 48 respectively, as will be described in more detail below.

Finally, in step 50 a session of a service for which service monitoring has been requested terminates and a SERVICE_SESSION_TERMINATION message 52 is sent back to service quality management system 12 from Service Quality Monitoring and Reporting Module (SQMRM) 12 as a quality report message 28. In some embodiments the SERVICE_SESSION_TERMINATION message 52 contains values of metrics stored in the monitored session list storage 20 for that service during the termination stage of the session.

In some embodiments the metrics and/or the parameters for metrics used during the service initiation stage, the service delivery stage and the service termination stage of the service session may be different from each other. This enables the service session monitoring to be adapted precisely to the different monitoring requirements in the different stages of a service session.

Figure 7:
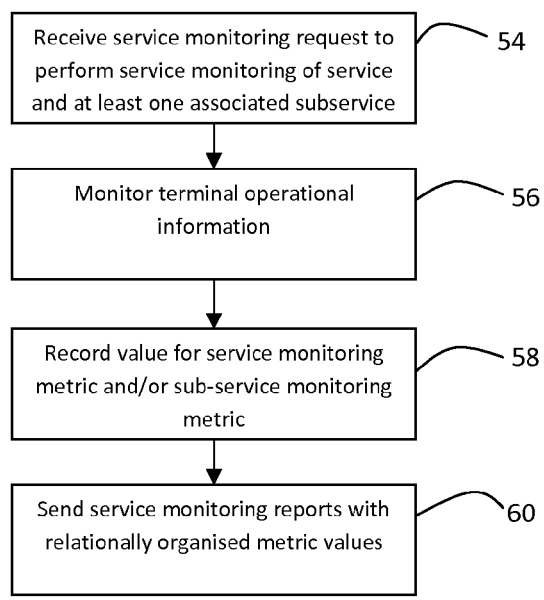
FIG. 7 is a flowchart showing a method in accordance with embodiments of the invention.

A method in accordance with embodiments of the invention will now be described with reference to FIG. 7.

In a first step, step 54, a service monitoring request to perform service monitoring of a service and at least one subservice associated with the service is received.

In a second step, step 56, terminal operational information is monitored during operation of the service.

In a third step, step 58, at least one value for service monitoring metrics and/or sub-service monitoring metrics derived from the terminal operational information is recorded.

In a fourth step, step 60, one or more service monitoring reports 28 are sent in respect of a service, wherein service monitoring metric values and sub-service monitoring metric values within the or each service monitoring report are relationally organised reflecting the association between the sub-service and the service.

An exemplary embodiment implementation of the Service Quality Monitoring and Reporting Module (SQMRM) 12 will now be described with reference to FIGS. 8-11. In the exemplary embodiment the quality monitoring of a single service by the Service Quality Monitoring and Reporting Module (SQMRM) 12 is described for simplicity. However quality of service monitoring for a plurality of services is possible, as is clear from the above description. One way this can be achieved is with the embodiment described later with reference to FIGS. 12 and 13. The skilled person will be able easily to apply the principles of service quality monitoring described herein to the quality of service monitoring of a plurality of services.

Figure 8:
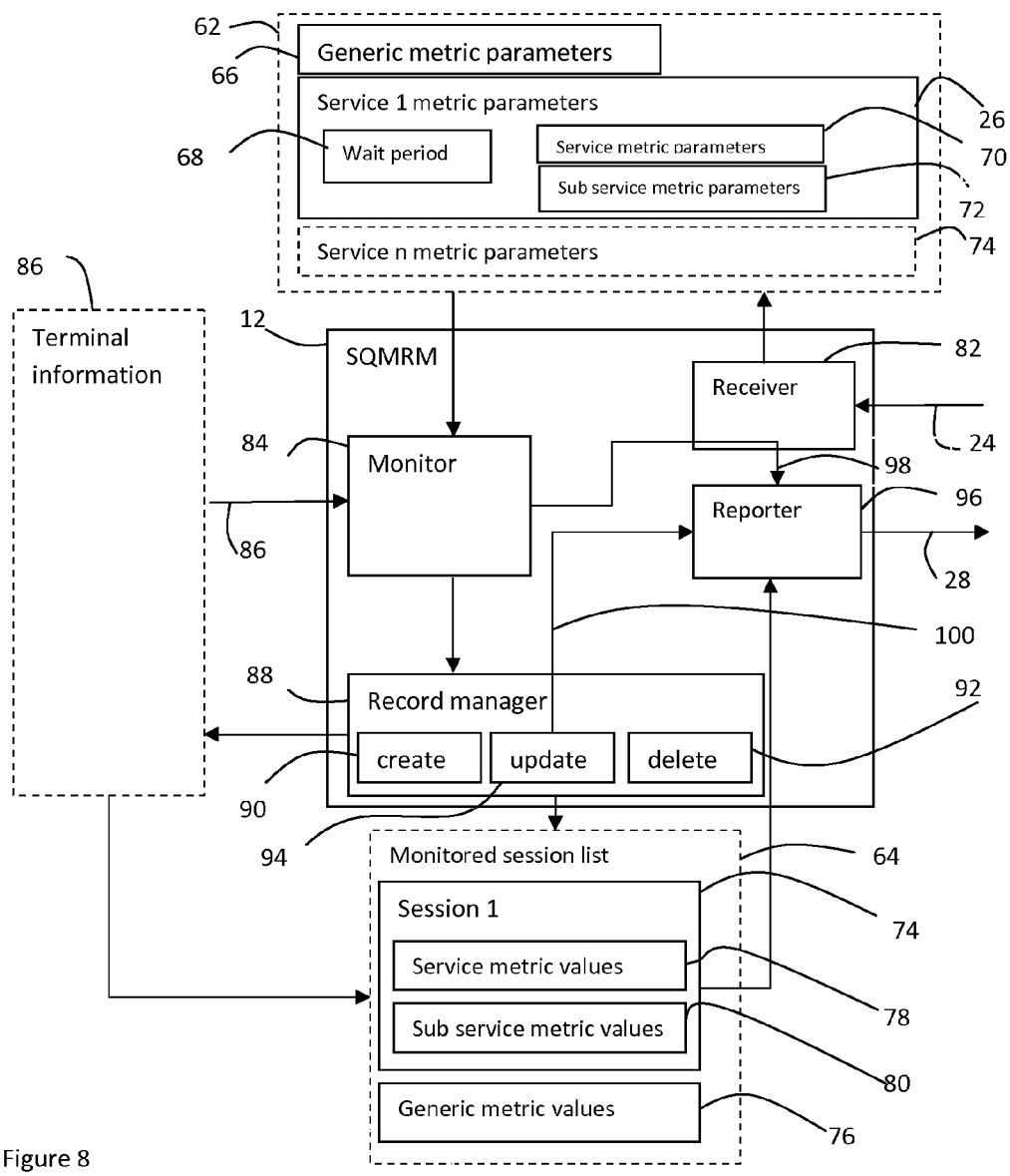
FIG. 8 is a schematic diagram showing an exemplary implementation of a service quality monitoring and reporting module.

FIG. 8 shows an exemplary implementation of a Service Quality Monitoring and Reporting Module (SQMRM) 12; a metric parameter store 62, which may be stored in the metric parameter storage 18; and a monitored session list 64, which may be stored in the monitored session list storage 20. Elements in FIG. 8 that are the same or similar to the corresponding features in FIG. 2 have been given the same reference numerals.

Metric parameter store 62 stores the parameters for the service monitoring operation carried out by Service Quality Monitoring and Reporting Module (SQMRM) 12. In the exemplary embodiment in which only a single service, service 1, is being monitored by Service Quality Monitoring and Reporting Module (SQMRM) 12, the parameters stored in metric parameter store 62 are:

Generic metric parameter set 66, which relate to non-service specific metrics that the Service Quality Monitoring and Reporting Module (SQMRM) 12 is to report to the Service Quality Management System (SQMS) 14; and service metric parameter set 26, which are parameters for service 1 to be monitored by Service Quality Monitoring and Reporting Module (SQMRM) 12. Within the service metric parameter set 26 for service 1 there is shown:

a wait period parameter 68;

one or more service metric parameters 70; and for each of one or more sub-services, there is stored a sub-service metric parameter set 72 comprising one or more sub-service metric parameters.

As indicated above, different metrics and/or different parameters may be provided for use in monitoring during different stages of the session In embodiments in which more than one service is being monitored by the Service Quality Monitoring and Reporting Module (SQMRM) 12, a respective service metric parameter set for each other service is also stored in metric parameter storage 62. This is shown in FIG. 8 by a service metric parameter set for service n 74 shown in dashed lines. For clarity, further details of the parameters for additional services have not been shown.

In addition, although not shown in FIG. 8, in some embodiments there may be provided default parameters that can be set as the parameters for service metrics. In such an embodiment, these default parameters may be set as the parameters for generic metrics, service metrics or sub-service metrics unless the default parameter is over-ridden by a metric parameter received from the Service Quality Management System (SQMS) 14.

The monitored session list 64 is provided to record values for monitored metrics for an active session of a monitored service, as previously indicated. In the exemplary embodiment an exemplary session record 74 for session 1 of service 1 is shown within the monitored session list storage 64. In addition a generic metric record 76 may be provided in some embodiments Service metric value record 78 of the session record 74 is provided to store values for the metrics specified for the monitored service, determined according to the service metric parameters stored in the corresponding service metric parameter set 26 in metric parameter store 62.

Figure 6:
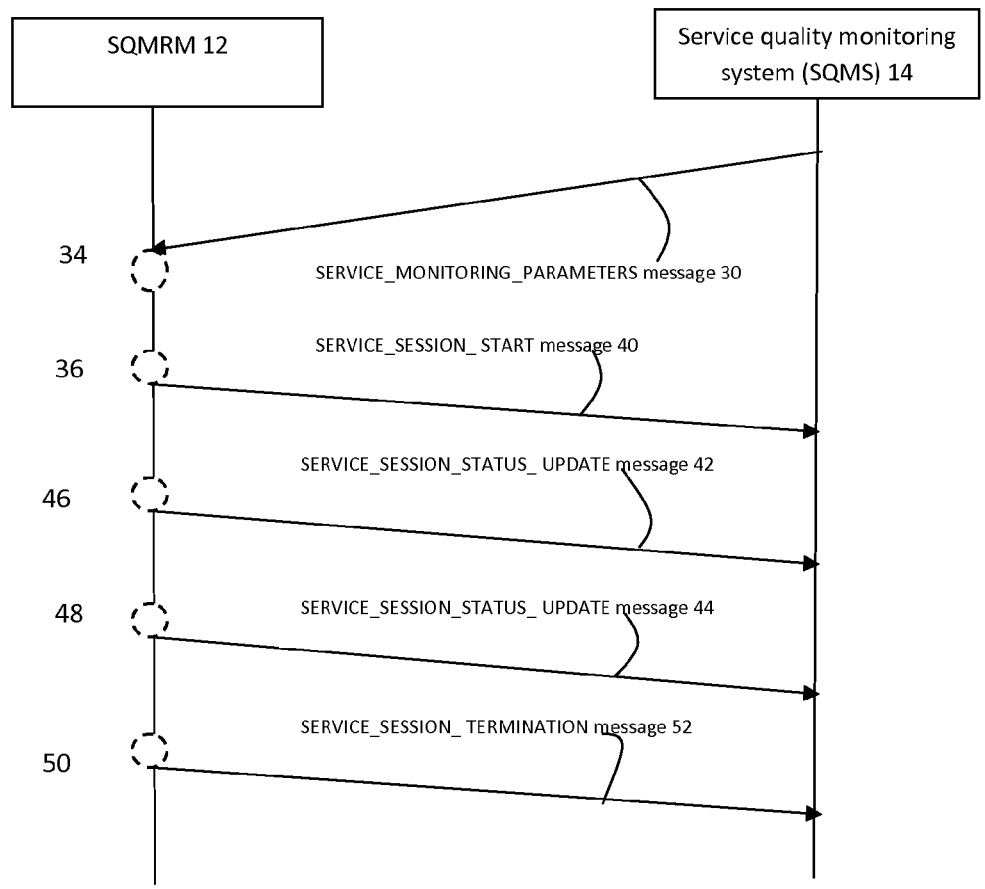
FIG. 6 is a diagram shows an exemplary exchange of messages between a service quality management system and a service quality monitoring and reporting module.

In the exemplary arrangement shown in FIG. 6, the service 1 has at least one sub-service, and a sub-service metric value record 80 stores metric values for this sub-service as a part of the session record 74 within the monitored session list storage 64.

In some embodiments, this sub-service session record 80 is added to the monitored session list 64 when a session of the sub-service is initiated. The sub-service metric value record 80 may remain in the session record 74 until the service session is terminated. In some embodiments the sub-service session record 80 is deleted when the sub-service session is terminated.

As noted above with reference to the metric parameter store 62, in practice the monitored session list 64 will have a session record 74 for every active session of a monitored service.

In the exemplary embodiment, service quality monitoring and reporting module (SQMRM) 12 has a receiver module 82, which is arranged to receive monitoring instruction message 24 and is operable to store metric parameters obtained from the monitoring instruction message 24 in the metric parameter store 62, as will be explained in more detail with reference to FIG. 9 and FIG. 10.

In the exemplary embodiment, service quality monitoring and reporting module (SQMRM) 12 has monitor module 84 operable to monitor sessions of a service or sub-service for which monitoring is required, as will be explained in more detail with reference to FIG. 9. The monitor module 84 monitors the operation of the service to determine the occurrence of a service session event, as will be explained in more detail below.

Some monitoring may involve the use of metric parameters stored in metric parameter store 62 and so monitor module 84 is coupled to metric parameter store 62 to access metric parameters 70,72 for services and sub services that are being monitored.

In addition monitor module 84 is coupled to terminal information 86 to monitor services operating on the terminal 10. The monitor module 84 may monitor services operating on the terminal in a number of different ways, as will be apparent to a skilled person. In particular, if the terminal 10 supports event-based processing the monitor module 84 can use event-based processing to monitor service activity in the terminal 10. In some embodiments the monitor module 84 may intercept packets sent to or from services running on the terminal 10 in order to monitor the services running on terminal 10. In addition some monitoring may involve the use of terminal service information supplied from terminal information store 16 to the monitoring module 84.

In the exemplary embodiment the service quality monitoring and reporting module (SQMRM) 12 is provided with a record manager module 88 for managing the monitored session list 64. The record manager module 88 is coupled to the monitor module 84 to receive notification from the record manager module 88 of the occurrence of a service session event and the record management module 88 operates to manage the monitored session list 64 in response to the notified session events.

In the exemplary embodiment the record manager module 88 has three functional elements for managing the monitored session list 64, namely: a create element 90; a delete element 92 and an update element 94.

The create element 90 operates to create a new entry in the monitored session list 64 in response to notification of the start of a new service session or new sub-service session. In some embodiments a service session record 74 is created in the monitored session list 64 to record values for the metrics for that service in a session in service metric value record 78 and, if applicable, the values for the metrics for a sub-service in a sub-service session sub-service metric value record 80. Typically the metrics for which values are recorded in service session records service metric value record 78 and metrics for which values are recorded in sub-service session records sub-service metric value record 80 will correspond respectively to the metrics identified by service metric parameters 70 and sub-service metric parameters 72 in the service 1 metric parameter record 26 in the metric parameter store 62.

In addition, in some embodiments, the create element 90 operates to create a generic values record to store values for generic metrics.

The delete element 92 operates to delete a service session record 74 in the monitored session list 64 in response to notification of the termination of the service session from the monitoring module 84. In some embodiments, sub-service session records 80 may be deleted in response to notification of the termination of the sub-service session received from the monitoring module 84. In some embodiments a record of terminated service or sub-service sessions may be kept in memory for a period of time if memory is available.

The update element 94 operates to update the metric values stored in a service session metric record 74 in the monitored session list 64 in response to a notification of the occurrence of a session metric update event received from the monitoring module 84. In order to update the metric values for a session, the update element 94 is operatively coupled to the terminal information 86 to obtain values for the service and/or sub-service metrics, and stores these values in the service metric value record 78 and sub-service metric value record 80 of the session record 74.

The update element 94 also operates to update metric values in the generic metric value record 76. In order to update the metric values for a session, the update element 94 is operatively coupled to the terminal information 86 to obtain values for the generic metric values. Generic metrics that may be used in some embodiments are exemplified by but not limited to: terminal information such as make/model/manufacturer; absolute statistics on delay/latency/jitter/throughput; temperature; CPU load; memory usage.

The update element 94 may also maintain a state indication (not shown explicitly in FIG. 8) for a metric value record indicating whether the record is an active record, which is to be updated, or whether the record is terminated, in which case the record is not to be updated.

In some arrangements in which values for a metric are recorded over a period of time prior to being sent in a service quality monitoring message 24, values for each metric at a plurality of different times may be recorded separately in the session record 74.

Alternatively, in some arrangements, the plurality of values for the same metric may be pre-processed, prior to being stored. In some embodiments, such pre-processing of the metric values is carried out by the update element 94 of the record manager module 88 and may involve accessing the stored values of metrics in order to combine stored metric values with newly obtained metric values. For example, in some cases the average value of a plurality of values for a metric taken at different times might be determined and then recorded in the session record by the update element 94.

In the exemplary embodiment the service quality monitoring and reporting module (SQMRM) 12 is also provided with a reporter module 96, for sending reports 24 containing the stored values service session metrics. Typically the reports might be sent to the service quality monitoring and reporting module (SQMS) 14 that instructed the monitoring of the service. However, more generally, the reports may be sent to any service monitoring entity. In some embodiments the service monitoring entity to which to send the service monitoring reports 24 are to be sent is specified in the received monitoring instruction message 24 relating to that service.

In some embodiments, the reporter module 96 is coupled to the monitor module 84 to receive a notification message 98 from the monitor module 84. The notification message 98 may relate to the occurrence of notifiable session events, such as the determination of a transition between the session stages that trigger the sending of a monitoring report message in some embodiments. In such embodiments the reporter module 96 is operable to send a service monitoring report 24 in response to notification of a session event. For example, in some embodiments the reporter module 96 may be operable to send a service monitoring report 24 in response to the notifications of the end of: the service initiation stage 4 of the session; the service delivery stage 6 of the session; the service termination stage 8 of the session.

The notification message 98 may alternatively or additionally relate to a notifiable service event, such as the start or termination of the service session; the elapse of a wait period; crossing a threshold set for a monitored metric; or the start or termination of a sub-service session in those embodiments with sub-services that will be discussed in more detail below.

In some embodiments the reporter module 96 may be operable to send a service monitoring report 24 in response to notification message 98 relating to the expiry of a service wait period for a service, as defined by a wait parameter 68 for the service.

In some embodiments the reporter module 96 may be operable to send a service monitoring report 24 in response to a notification message 98 relating to the start or end of a sub-service session within the monitored service session.

In some embodiments the reporter module 96 may be operable to send a service monitoring report 24 in response to a notification message 98 relating to the crossing by the value of a monitored metric of a threshold set for that metric, as defined by a threshold parameter for that metric stored in 70 or 72.

In some embodiments, a service monitoring report 24 for a service is sent in response to an update of the metric values in the service session record 74 in the monitored session list storage 64. The reporter module 96 may therefore be coupled to the update element 94 to receive a notification message 100 informing the reporter module 96 of the completion of an update of the values for service metrics in the service session record 74. In such embodiments the reporter module 96 is operable to send a service monitoring report 24 with the service session metric values on receipt of the notification of completion of an update.

The service monitoring report 24 contains values for metrics for at least one service session. The reporter module 96 is coupled to the monitored session list 64 to obtain values for metrics 78 relating to a monitored service session. In the exemplary embodiment in which values for metrics for session 1 of service 1 are being recorded in the service session record 74, the reporter module 96 obtains metric values from the service metric value record 78 and from the sub-service metric value record 80 to form a service monitoring report 24.

In arrangements in which values for a metric are recorded over time prior to being sent in a service monitoring message 24, values for each metric at a plurality of different times may be recorded separately in the session record 74 and all recorded metric values may be sent in a single report message 24.

Alternatively, in some arrangements, the plurality of values for the same metric may be pre-processed prior to being sent in the service monitoring message 24 by the reporter module 96. For example, in some cases the average value of a plurality of values for a metric taken at different times might be determined by the reporter module 96, and only the average metric value sent in the service monitoring message 24.

In some embodiments the service monitoring reports 24 may contain values for generic metrics. Therefore, the reporter module 96 is also coupled to the generic metric value record 76 to obtain values for generic metrics to be included in the service monitoring report 24.

As discussed above the generic metric information is obtained from the terminal information 38 and may in some embodiments relate to one or more of: report id; session id; report type; time stamp; location; terminal id; terminal address; terminal type; terminal name; user id; user name; access network id; result (of termination); error code; error message; trigger event.

In some embodiments generic metric information, such as a result of termination/error code/error message is generated by the monitor module 84 and may be supplied direct to the reporter module 96 or may be supplied to the record management module 88 for storing in the generic metric value record 76 relating to the respective update of the service.

Finally, in some embodiments a service monitoring report 24 sent to a monitoring entity, such as a Service Quality Management System (SQMS) 14, relates to values for service metrics for a single service, together with values for service metrics for any sub-services of the service. However, in other embodiments the reporter module 96 sends a service monitoring report 24 containing service metric values for more than one service. Thus an indication of the number of different services for which metrics are included in a report may also be indicated, for example in the generic metrics section, of a service monitoring report 24. The reporter module 96 can add this generic metric value itself.

The division of the functions performed within the Service Quality Monitoring and Reporting Module (SQMRM) 12 into the functional modules and the details of the connections between the modules described herein should be understood to be merely illustrative. As will be apparent to a skilled person it is possible to implement the functionality described in many different ways, and all such variations are intended to be encompassed within the scope of the present invention.

In particular, the functional modules shown within the Service Quality Monitoring and Reporting Module (SQMRM) 12 in FIG. 8 may be implemented in a computer software program running on a suitable processing device, in which the program flow and/or sub-routine calls may provide the described functionality without explicit couplings between the sub-routines.

An exemplary method of service monitoring in the exemplary implementation shown in FIG. 8 will now be described with reference to FIG. 9. The method of FIG. 9 will be explained with reference to the functional modules shown in, and described with reference to, FIG. 8. However, the method of the exemplary embodiment shown in FIG. 9 may be implemented in other apparatus/device arrangements as will be apparent to a skilled person.

Figure 9:
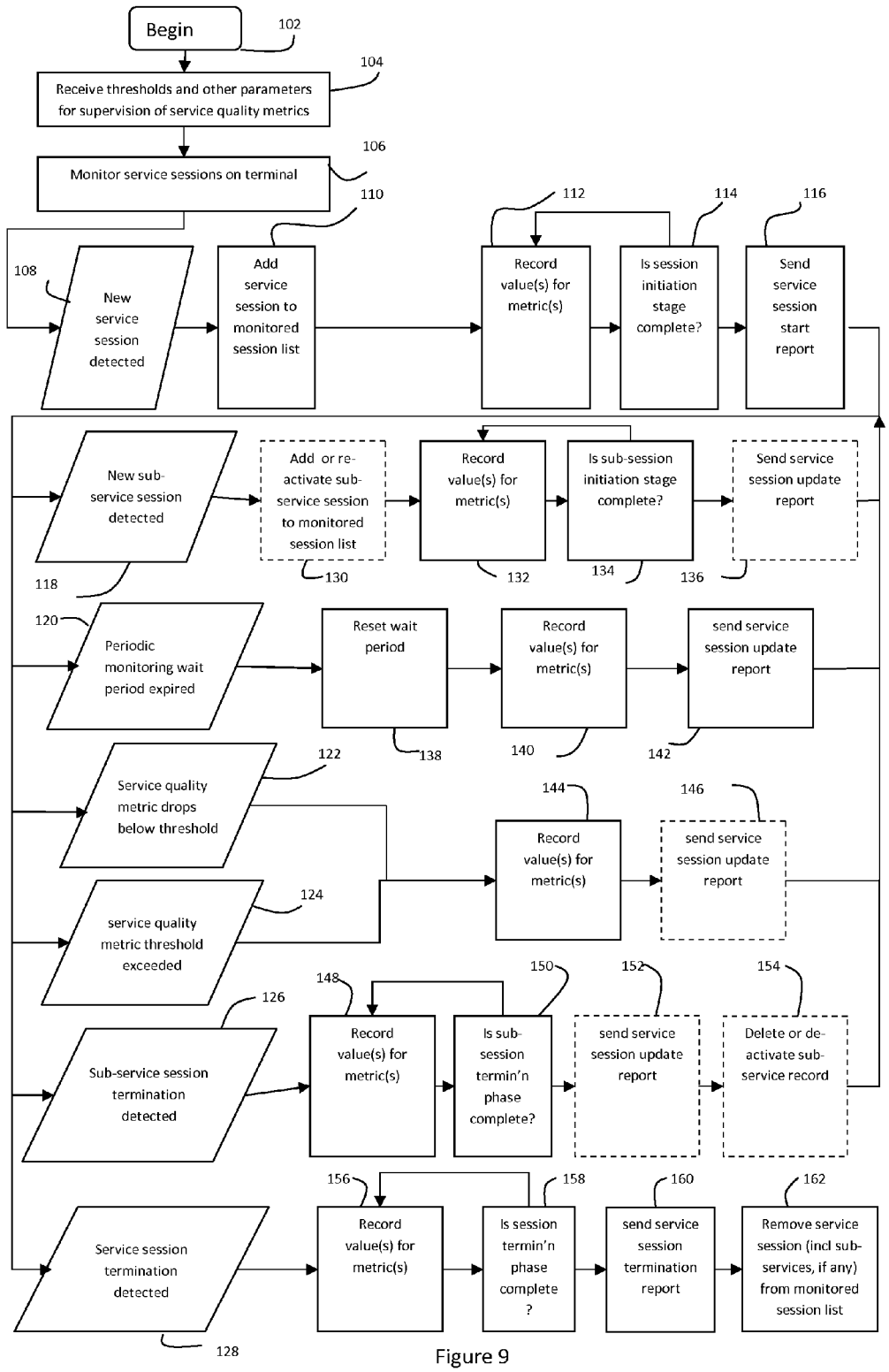
FIG. 9 is a flowchart showing a method of service monitoring in the exemplary implementation shown in FIG. 8.

The method of FIG. 9 applies to the monitoring of a single service, Service1, and assumes that service 1 is not active, and so no sessions of service 1 are running, when the monitoring of Service1 is requested. The method of FIG. 9 may be carried out by the service quality monitoring and reporting module (SQMRM) 12 in respect of a number of different services simultaneously, as will be apparent to a skilled person, and the simultaneous monitoring of more than one service will be described in more detail later.

Thus initially in step 102 of the exemplary method shown in FIG. 9, no monitoring of the service, Service1, has been requested and no session of service 1 is running.

In step 104 of the exemplary method shown in FIG. 9, thresholds and other parameters for service quality supervision for supervision of service quality metrics are received. These received thresholds and other parameters for service quality supervision may be stored ready for use during service supervision.

In the exemplary embodiment shown in FIG. 8, in step 104 the receiver module 82 receives a monitoring instruction message 24, and extracts metric parameters from the monitoring instruction message 24. The receive parameter module 82 stores received generic metric parameters in generic metric parameters store 62, and stores received metric parameters relating to Service1 in service metric parameter record 26.

An exemplary method of extracting parameter metrics from a service_monitoring_parameters message and storing metric parameters for services and associated sub-services in the metric parameter store 62 ready to be used for service monitoring in accordance with one embodiment will be described later with reference to FIG. 10.

Once the service metric parameter record 26 for a service to be monitored is established, the service quality monitoring of Service1 can begin.

In step 106 of the exemplary method shown in FIG. 9 activity on the terminal 10 is monitored to determine the start of a service session of Service1 for which monitoring has been instructed.

In the exemplary embodiment shown in FIG. 8, in step 106 the monitoring module 84 may monitor the terminal operation in order to detect the start of a session of service 1, for which monitoring has been instructed.

In some embodiments the monitoring of the terminal operation in order to detect the start of a service session may be achieved by enabling the monitoring module 84 to monitor the terminal operating system. The monitoring module 84 and monitors the resource usage of the process that is running a session, for example the application client. This method is more suited to detection of service session rather than the detection of sub-service sessions.

In some embodiments the monitoring of the terminal operation in order to detect the start of a session of service 1, for which monitoring has been instructed may be achieved by the implementation of the Service Quality Monitoring and Reporting Module (SQMRM) 12 internally within a service application client. The service application client can inform the Service Quality Monitoring and Reporting Module (SQMRM) 12 when a service session or a sub-service session initiation or termination event occurs.

In some embodiments the monitoring of the terminal operation in order to detect the start of service session may be achieved by the use of a separate Service Quality Monitoring and Reporting Module (SQMRM) 12 that is able to connect to the service application client over an API (Application programming interface) or other interface. The service application client can inform the Service Quality Monitoring and Reporting Module (SQMRM) 12 when a service session or a sub-service session initiation or termination event occurs.

In some embodiments the monitoring of the terminal operation in order to detect the start of a service session for some application clients (web browsers for example) may be achieved by the use of a plug-in for the browser implementing the functionality of the Service Quality Monitoring and Reporting Module (SQMRM) 12.

In step 108 of the exemplary method shown in FIG. 9 a new service session is detected. The detection of the start of the service session may be accomplished in a variety of different ways in accordance with different embodiments, as set out above.

In step 110 of the exemplary method shown in FIG. 9 the new service session is added to the monitored session list.

In the exemplary embodiment shown in FIG. 8, in step 110 the monitor module 84 notifies the create element 90 of the new session for monitored service 1 and the create element 90 adds the service 1 session to the monitored session list 64. In the exemplary embodiment a session record 74 is created for storing monitored metric values for service 1.

In step 112 of the exemplary method shown in FIG. 9, values for at least the metrics specified for the service on the monitored session list are recorded. In some embodiments values for quality metrics for all services and sub services being monitored simultaneously are recorded in the respective session records in the monitored session list.

In the exemplary embodiment shown in FIG. 8, the update element 94 identifies values for the service metrics specified to be monitored for service 1 from the terminal information 86 and obtains the respective metric values from the terminal information 86 and stores the service metrics values in service metric value record 78.

In step 114 of the exemplary method shown in FIG. 9 it is determined whether the service initiation stage of the session has been complete. The determination of whether the service initiation stage of the session has been complete may be accomplished in a variety of different ways in accordance with different embodiments.

In the exemplary embodiment shown in FIG. 8, the monitor module 84 monitors the terminal information 86/terminal events/to determine whether the session initiation stage 4 of the session is complete, and sends a notification message 98 to the reporter module 96.

While the service initiation stage of the service session is not yet complete, step 114—no, the values for the metrics may be recorded one or more times in step 112.

In some embodiments a report containing the recorded values for the metrics may be sent after each step of recording values for the metrics in step 112. In other embodiments, a set of recorded values may be recorded at a plurality of time intervals, and sent in a single service session start report, as will be seen from a consideration of steps 114 and 116. The period between each step of recording values for the metrics in step 112 may be a default value, or may be instructed by the monitoring entity service quality management system (SQMS) 14. In embodiments of the invention this may be achieved by the use of a field in the monitoring instruction message 24, for example one of the metricN_parameter of the exemplary monitoring instruction message 24 shown in FIG. 3, being used to specify different reporting or recording periods.

Once the session initiation stage is complete, 114—yes, a service session start report may be sent, step 116 of the exemplary method shown in FIG. 9. The service start report contains one or more sets of metric values for the service session recorded in step 112, or may contain values reflecting averaged values recorded for the metrics over the service initiation stage of the session as previously discussed.

In the exemplary embodiment shown in FIG. 8, in response to the notification message 98 received from the monitor module 84, the reporter module 96 prepares and sends a service session start report message 24 with the metric value sets stored in service metric value record 78 and the generic metrics.

After the completion of the service initiation stage, the service enters the service delivery stage. In the service delivery stage of the service session, the service is monitored to determine the following session events:

whether a new sub-service session has been detected step 118 whether a periodic monitoring wait period for the service has expired step 120;

whether a service quality metric has a value outside a permissible range or threshold step 122;

whether a service quality metric has a value returning within a permissible range or threshold step 124;

whether a sub-service session has terminated, step 126; or whether the termination of the service session is detected step 128.

In the exemplary embodiment, the monitoring module 84 monitors the operation of service 1 using the terminal information 86 and parameters stored in service metric parameter record 26 to determine session events in the service delivery stage 6 of the service session.

In some embodiments different parameters of the metrics and/or a different set of metrics may be used in the service delivery stage.

When a service session is being monitored, a new sub-service session may be initiated, for example if a new website is accessed via a browser. The start of the new sub-service session is detected in step 118 of the exemplary method shown in FIG. 9.

In the exemplary embodiment shown in FIG. 8, the start of the new sub-service session is detected by the monitor module 84, by one of the variety of methods outlined above. The monitor module 84 notifies the record manager 88 of the new sub-service session with a service event notification.

Thereafter, if necessary, the sub-service session is added to the monitored session list, in step 130 of the exemplary method shown in FIG. 9.

In the exemplary embodiment shown in FIG. 8 the create element 90 receives a notification from the monitoring module 84 of the start of the new sub-session and the create element 90 creates a sub-service record 80 in the session record 74 in response to the start of the sub-service notified by the monitoring module 84 to the create element 90.

Step 130 is not necessary in all embodiments, and is therefore shown in dashed lines. One example of a situation in which it may not be necessary to add the sub-service session to the monitored session list is where a sub service relates to access to a particular URL or website. In a web browser session a user may access a URL or web site address on more than one occasion. In this situation in some embodiments it is not necessary to create a new sub-service metric record in the monitored session list for the second or subsequent access, but instead the previously established sub-service metric record may be used.

In the exemplary embodiment shown in FIG. 8, the record manager module 88 is also operable to distinguish between active sub-service metric record for a current sub-service session and inactive sub-service metric record for a sub-service session that has been previously terminated. This could be achieved using a state indication on the service session or sub-session record that can be updated by the Service Quality Monitoring and Reporting Module (SQMRM) 12 after the record has been stored. Once a session/sub-session terminates, the state of the service session record or the sub-service session record will be set to a terminated status and, while it remains in memory, it will not be updated further.

Thus if a new session is detected for a sub-service for which a previous session has been terminated, the sub-service metric value record 80 for that sub-service can be re-activated, for example by the create element 90 and the re-activated sub-service metric value record 80 used by the update element 94 to store the values for sub-service metrics.

In step 132 of the exemplary method shown in FIG. 9, values for at least the sub-service metrics as defined in the sub-service session record in the monitored session list are stored. In some embodiments, values for the quality metrics for a corresponding service are also recorded in step 132. In some embodiments values for quality metrics for all services and sub services being monitored simultaneously are recorded in the respective session records in the monitored session list.

In the exemplary embodiment shown in FIG. 8, the update element 94 identifies values for the sub-service metrics specified to be monitored for the sub-service from the terminal information 86 and obtains the metric values for those metrics from the terminal information 86 and stores the service metrics values in sub-service metric value record 80. Again, the values for quality metrics of the sub-service are recorded for the session initiation stage of the sub-service session, and the end of the session initiation stage of the sub-service session is monitored in step 134 of the exemplary method shown in FIG. 9. During the session initiation stage (134—no) the values for the metrics may be recorded once or a number of times, in step 132.

In the exemplary embodiment shown in FIG. 8, the monitor module 84 monitors the terminal information 86 and/or terminal events to determine whether the session initiation stage 4 of the sub-service session is complete, and sends a service event notification message 98 to the reporter module 96 in response to a positive determination.

In some embodiments a report containing the recorded metric values may be sent after each step of recording values for the metrics in step 132. In other embodiments, a set of recorded values may be recorded at a plurality of time intervals, and sent in a single service session start report, as will be seen from a consideration of steps 134 and 136. The period between each step of recording values for the metrics in step 132 may be a default value, or may be instructed by the monitoring entity service quality management system (SQMS) 14

In embodiments of the invention this may be achieved by the use of a field in the monitoring instruction message 24, for example one of the metricN_parameter of the exemplary monitoring instruction message 24 shown in FIG. 3, being used to specify different reporting or recording periods.

In the exemplary embodiment shown in FIG. 8 the update element 94 may send a notification 100 to the reporter module 96 when update of the session record 74 is complete. In response, the reporter module 96 prepares and sends a service session update report message 24 with at least the metric value sets stored in sub-service metric value record 80 and the generic metrics stored in generic metric value record 76.

Once the sub-service session initiation stage is complete, 134—yes, in some embodiments as shown in step 136 of the exemplary method shown in FIG. 9 a service session update report can be sent. The service session update report may contain one or more sets of metric values recorded in step 132, or may contain values reflecting averaged values recorded for the metrics over the service initiation stage of the sub-service session, as previously discussed. This step 136 may be omitted in some embodiments and is therefore shown in dashed lines.

In the exemplary embodiment shown in FIG. 8, in response to the notification message 98 received from the monitor module 84, the reporter module 96 prepares and sends a service session update report message 24 with at least the metric value sets stored in sub-service metric value record 80 and the generic metrics stored in generic metric value record 76. Metric values for the service to which the sub-service is associated may be reported at the same time in some embodiments. In addition metric values for other sub-services associated with the service, and/or other service may also be reported in some embodiments.

Thereafter, the service session monitoring continues.

When a service session is being monitored, the wait period specified by the wait parameter relating to the service that was received in the service_monitoring_parameters message may expire, step 120 of the exemplary method shown in FIG. 9. When this occurs, the wait period counter is reset in step 138 of the exemplary method shown in FIG. 9 and the values of quality metrics for at least the service and any sub-services specified on the service record 74 in the monitored session list 64 are recorded in step 140. A service session update report is then sent, in step 142.

In the exemplary embodiment shown in FIG. 8, steps 120 and 138 are carried out by the monitor module 84. This may be achieved in some embodiments by the monitor module 84 reading the wait parameter value 68 for the monitored service from the service parameter store 26, and using this value to set a counter. Once the period of time specified by the wait period parameter 68 has expired, the monitor module 84 resets the counter with the wait period parameter 68. The monitor module then sends a service event notification or instruction to the record manager 88 in response to which the record manager 88 updates the service session record for the monitored service session 74. The record manager update element 94 identifies values for the metrics specified to be monitored for the service and any active sub-services from the terminal information 86 and obtains the metric values from the terminal information 86 and stores the service metrics values in service metric value record 78 and sub-service metric values in sub-service metric value record 80.

In the exemplary embodiment shown in FIG. 8 the update element 94 may send a notification 100 to the reporter module 96 when update of the session record 74 is complete. In response, the reporter module 96 prepares and sends a service session update report message 24 with at least the metric value sets stored in sub-service metric value record 80 and the generic metrics stored in generic metric value record 76.

Thereafter, the service session monitoring continues.

When a service session is being monitored, the value of a service quality metric may fall below a threshold set for that metric, step 122, or may exceed a service quality metric threshold, step 124 of the exemplary method shown in FIG. 9. The threshold may be a default value, or in some embodiments the threshold for the parameter may have been received with the monitoring instruction message 24. In either case, the values of quality metrics on the monitored session list are recorded in step 144. In some embodiments, a service session update report is sent, step 146. Thereafter, the service session monitoring continues.

In the exemplary embodiment shown in FIG. 8, steps 122 or 124 are carried out by the monitor module 84. This may be achieved in some embodiments by the monitor module 84 reading the threshold parameter values for monitored service metrics or sub-service metrics, if applicable, from the service parameter store 26. During the service session monitoring, the values of the metrics for which a threshold is set are compared with the respective threshold. If the value of a metric crosses a monitored threshold, the monitor module 84 sends an instruction to the record manager 88 to update the service session record for the monitored service session 74. The record manager update element 94 identifies values for the metrics specified to be monitored for the service and any active sub-services from the terminal information 86 and obtains the metric values from the terminal information 86 and stores the service metrics values in service metric value record 78 and sub-service metric values in sub-service metric value record 80.

In the exemplary embodiment shown in FIG. 8 the update element 94 may send a notification 100 to the reporter module 96 when update of the session record 74 is complete. In response, the reporter module 96 prepares and sends a service session update report message 24 with at least the metric value sets stored in sub-service metric value record 80 and the and the generic metrics stored in generic metric value record 76. However, in some embodiments the recorded metric values are sent later, and the step of sending a service session update report is shown in dashed lines.

Thereafter, the service session monitoring continues.

When a service session is being monitored, an existing sub-service session may terminate, as shown in step 126 of the exemplary method shown in FIG. 9.

In the exemplary embodiment shown in FIG. 8, the termination of the sub-service session is detected by monitor module 84. The monitor module 84 notifies the record manager 88 of the termination of the sub-service session with a session event notification.

Once the sub-service termination is detected in step 126, the values for metrics are recorded during the termination of the sub-service in 148 until the sub-service termination stage is complete, step 150. As shown by the return path from step 150 to step 148, during the termination stage of the sub-service, one or a number of different sets of values for quality metrics in the monitored session list may be recorded. In some embodiments one or more service session update messages may be sent step 148 during the sub-service termination stage.

In step 148 of the exemplary method shown in FIG. 9, values for at least the sub-service metrics as defined in the sub-service session record in the monitored session list are stored. In some embodiments, values for the quality metrics for a corresponding service are also recorded in step 148. In some embodiments values for quality metrics for all services and sub services being monitored simultaneously are recorded in the respective session records in the monitored session list.

In the exemplary embodiment shown in FIG. 8, in response to the notification of sub-service termination, the update element 94 identifies values for the sub-service metrics specified to be monitored for the sub-service from the terminal information 86 and obtains the metric values for those metrics from the terminal information 86 and stores the service metrics values in sub-service metric value record 80.

The values for quality metrics of the sub-service are recorded during the session termination stage of the sub-service session, and the end of the session termination stage of the sub-service session is monitored in step 150 of the exemplary method shown in FIG. 9. During the session termination stage (step 150—no) the values for the metrics may be recorded once or a number of times, in step 148.

In the exemplary embodiment shown in FIG. 8, the monitor module 84 monitors the terminal information 86 and/or session events to determine whether the session termination stage 4 of the sub-service session is complete. In some embodiments for example where the step 148 is executed a number of times, the monitor module 84 may send a sub-service session termination notification message to the record manager module 88 in response to a positive determination. In response, the update element 94 stops updating the record.

In some embodiments a report containing the recorded metric values may be sent after each step of recording values for the metrics, as shown in step 154. In other embodiments, a set of recorded values may be recorded at a plurality of time intervals, and sent in a single service session update report, as will be seen from a consideration of steps 150 and 152. The period between each step of recording values for the metrics in step 148 may be a default value, or may be instructed by the monitoring entity service quality management system (SQMS) 14

In embodiments of the invention this may be achieved by the use of a field in the monitoring instruction message 24, for example one of the metricN_parameter of the exemplary monitoring instruction message 24 shown in FIG. 3, being used to specify different reporting or recording periods.

Once the sub-service session termination stage is complete, step 150—yes, in some embodiments as shown in step 152 of the exemplary method shown in FIG. 9 a service session update report can be sent. The service session update report may contain one or more sets of metric values recorded in step 148, or may contain values reflecting averaged values recorded for the metrics over the service initiation stage of the sub-service session, as previously discussed. This step 152 may be omitted in some embodiments and is therefore shown in dashed lines.

In the exemplary embodiment shown in FIG. 8 the update element 94 sends a notification 100 to the reporter module 96 when update of the session record 74 is complete. In response, the reporter module 96 prepares and sends a service session update report message 24 with at least the metric value sets stored in sub-service metric value record 80 and the generic metrics stored in generic metric value record 76.

After the sub-session termination stage is complete, there is no longer any need to update the sub-service session record in the monitored session list. In some embodiments the sub-service record in the monitored session list may be deleted, step 154 as shown in dashed lines in FIG. 9. In other embodiments the sub-service record is not deleted, but is not updated after the end of the sub-service session, for example because the sub-service session status is marked as "terminated".

In the exemplary embodiment shown in FIG. 8, the delete element 92 deletes the sub-service session record 80 once the reporter module 96 has sent the service session update report message 24 with at least the metric value sets stored in sub-service metric value record 80.

Thereafter, the service session monitoring continues.

When a service session is being monitored, the termination of the service session may be determined, step 128 of the exemplary method shown in FIG. 9.

In the exemplary embodiment shown in FIG. 8, the termination of the sub-service session is detected by monitor module 84. The monitor module 84 notifies the record manager 88 of the termination of the sub-service session with session event notification.

Once the service termination is detected in step 128, the values for metrics are recorded during the termination of the sub-service in step 156 until the service termination stage is complete, step 158. As shown by the return path from step 158 to step 156, during the termination stage of the service, one or a number of different sets of values for quality metrics in the monitored session list may be recorded. In some embodiments one or more service session update messages may be sent during step 156 during the sub-service termination stage.

In step 156 of the exemplary method shown in FIG. 9, values for the service metrics as defined in the service metric value record 74 in the monitored session list 40 are stored. In some embodiments values for quality metrics for all services and sub services being monitored simultaneously are recorded in the respective session records in the monitored session list.

In the exemplary embodiment shown in FIG. 8, in response to the notification of service termination, the update element 94 identifies values for the service metrics specified to be monitored for the service from the terminal information 86 and obtains the respective metric values for those metrics from the terminal information 86 and stores the service metrics values in service metric value record 74. Again, in some embodiments the parameters for the metrics and/or the metrics themselves used during the termination phase may be different from the metrics and/or parameters used during the service delivery stage of the session.

The values for quality metrics of the service are recorded during the session termination stage of the service session, and the end of the session termination stage of the sub-service session is monitored in step 158 of the exemplary method shown in FIG. 9. During the session termination stage (step 158—no) the values for the metrics may be recorded once or a number of times, in step 156.

In the exemplary embodiment shown in FIG. 8, the monitor module 84 monitors the terminal information 86 and/or terminal events to determine whether the session termination stage 8 of the service session is complete.

In some embodiments, for example in embodiments where the step 156 is executed a number of times, the monitor module 84 may send a service session termination notification message to the record manager module 88 in response to a positive determination by the monitor module 84 of the termination of the service session. In response, the update element 94 stops updating the record.

Once the service session termination stage is complete, step 158—yes, a service session termination report is sent as shown in step 160 of the exemplary method shown in FIG. 9. The service session termination report may contain one or more sets of metric values recorded during the termination stage of the session in step 156, or may contain values reflecting averaged values recorded for the metrics over the service termination stage of the sub-service session, as previously discussed.

In the exemplary embodiment shown in FIG. 8 the update element 94 sends a notification 100 to the reporter module 96 when update of the session record 74 is complete. In response, the reporter module 96 prepares and sends a service session termination report message 24 with the metric value sets stored in service record 74 and the generic metrics stored in generic metric value record 76.

Once the service session termination report is sent in step 160 of the exemplary method shown in FIG. 9, the service session, and any associated sub-service session records may be deleted from the monitored session list. In other embodiments the service session record is not deleted, but is not updated after the end of the service session.

In the exemplary embodiment shown in FIG. 8, the delete element 92 deletes the service session record 78 once the reporter module 96 has sent a service session termination report message 24 with at least the metric value sets stored in service metric value record 74.

Figure 10:
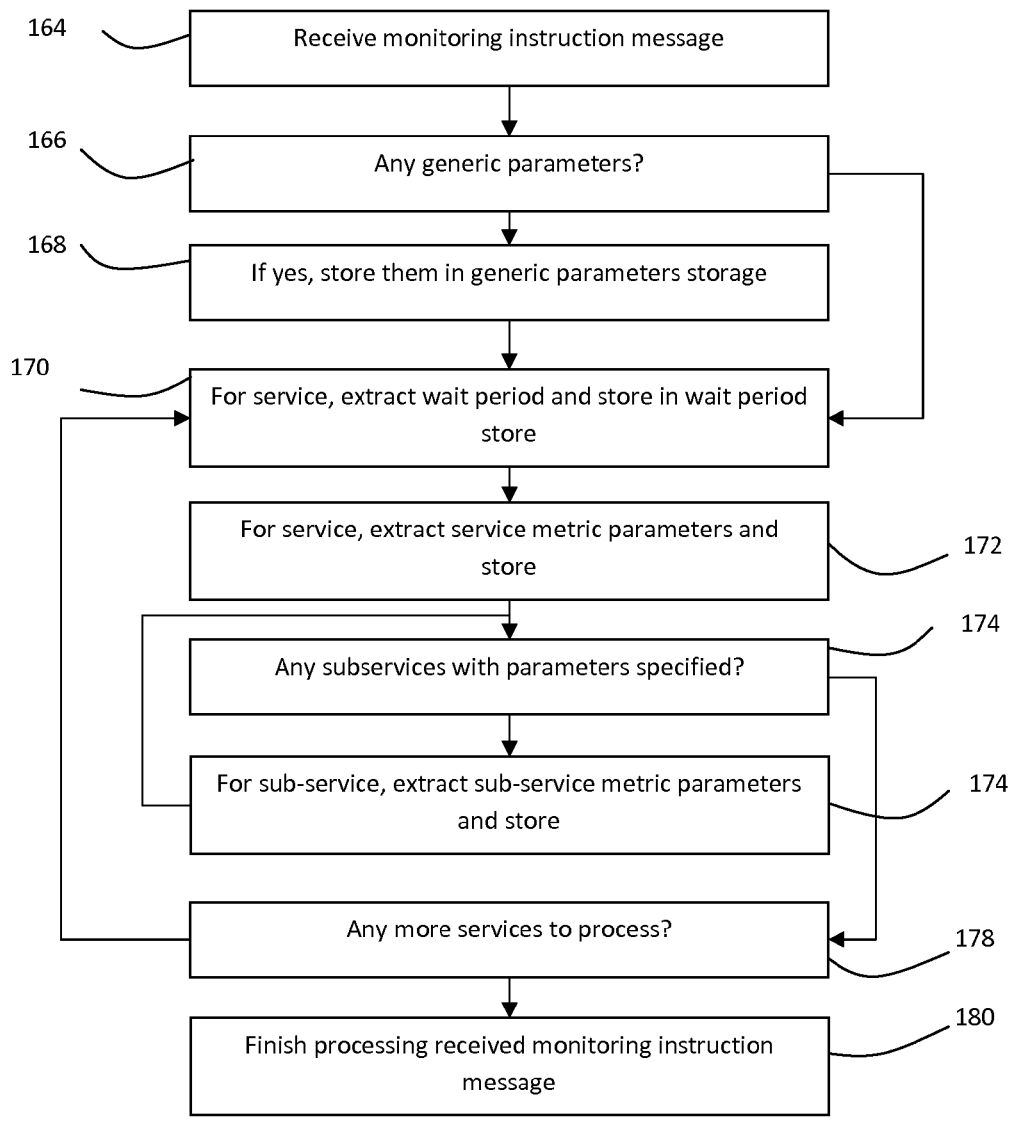
FIG. 10 is a flow chart showing an exemplary method of extracting parameter metrics from a monitoring instruction message.

FIG. 10 illustrates an exemplary method of extracting parameter metrics from a monitoring instruction message 24 in accordance with one embodiment. This exemplary method may be carried out by receiver module 82 shown in FIG. 8.

In step 164, a monitoring instruction message 24 is received.

In step 166 it is determined whether any generic parameters are specified in the received monitoring instruction message 24. This may be done by parsing the received message in some embodiments, or by using any suitable parameter recognition technique.

If generic parameters are present, step 166—yes, the generic parameters are extracted from the monitoring instruction message 24 and are stored in a generic parameter storage area for Service1, in step 168. This is generic metric parameter store 66 in the exemplary embodiment of FIG. 8.

If no generic parameters are specified in the received monitoring instruction message 24 (step 166—no) or after the received generic parameters are stored in 168, a wait period parameter is extracted from the monitoring instruction message 24 and is stored in service metric parameter storage for Service1.

This is wait period parameter 68 in the exemplary embodiment shown in FIG. 8. As discussed, the wait period parameter defines a period after which values of the service metrics should be recorded and reported. The wait period parameter for a service therefore specifies the maximum time that may elapse between service metric reports for a service being sent. It is envisaged that services will generally have a wait period parameter: however a wait parameter may be omitted for some embodiments, in which case step 170 may be omitted.

In step 172 the service metric parameters for Service 1 are extracted from the received monitoring instruction message 24 and are stored in service metric parameter storage for Service1. These are service metric parameters 70 in the exemplary embodiment shown in FIG. 8.

Clearly, different services may have different metrics to be used in monitoring the service. In additions, the same metric may have different parameters applied to it in different circumstances.

In some embodiments, less than a full set, or even no parameters for a particular metric are included in the monitoring instruction message 24. In this case, in some embodiments default values are used for the parameters.

In some embodiments, only the metrics specified on the monitoring instruction message 24 are measured by the Service Quality Monitoring and Reporting Module (SQMRM) 12 and used for service quality evaluation for the service. In other embodiments default metrics that are not specifically included in the monitoring instruction message 24 are measured and reported in addition to any metrics or any specific parameter values specified in the monitoring instruction message 24.

In step 174 it is determined whether the Service1 has any sub-services metric parameters in the monitoring instruction message 24.

If Service 1 has sub-service metric parameters, the sub-service metric parameters are extracted from the received monitoring instruction message 24 and are stored in sub-service metric parameter storage for Service1 in step 176.

Steps 174 and 176 are repeated until the metric parameters for all sub-services of service Service1 have been stored.

Once all the metric parameters for sub-services for Service1 have been stored (step 174—no) or if there were no sub-services of the service being processed, it is determined whether the monitoring instruction message 24 contains metric parameters relating to any more services in step 178. If so, (step 178—yes) the process returns to step 170 to extract the wait period; service metric parameters and then sub-service metric parameters, as appropriate for the or each further service for which metric parameters are included in the monitoring instruction message 24.

Once all the metric parameters for all services included in the monitoring instruction message 24 have been processed, step 178—no, the processing of the monitoring instruction message 24 has finished, step 180.

Figure 11:
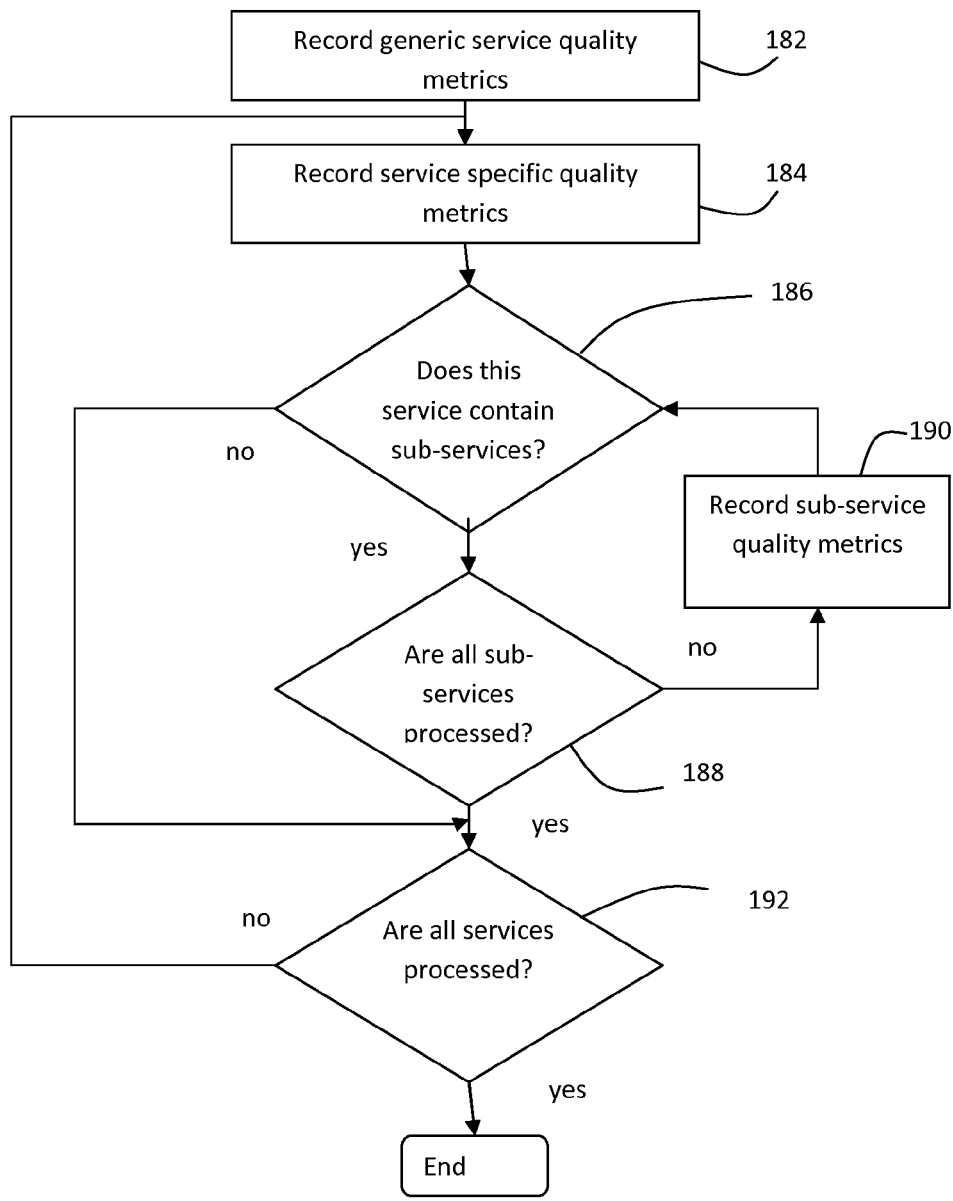
FIG. 11 is a flow chart showing an exemplary method for recording values for service session metrics and sub-service session metrics.
Figure 12A:
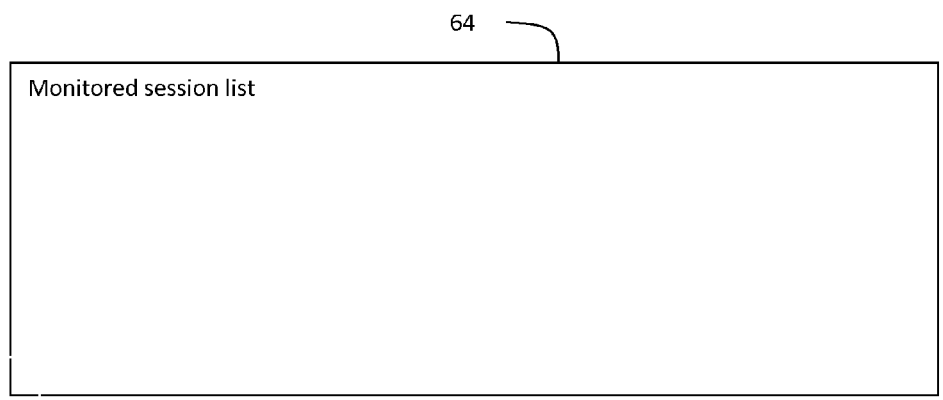
FIGS. 12a-m illustrate the change in the contents of the monitored session list during use of two services in an exemplary embodiment.
Figure 12B:
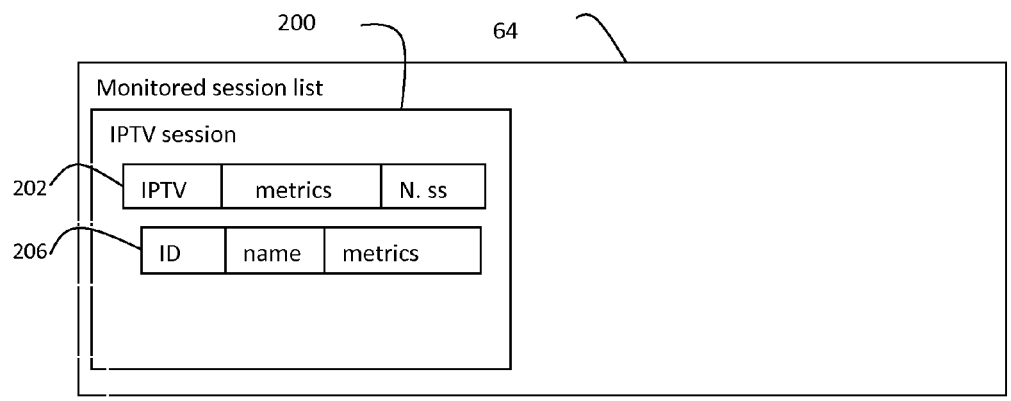
Figure 12C:
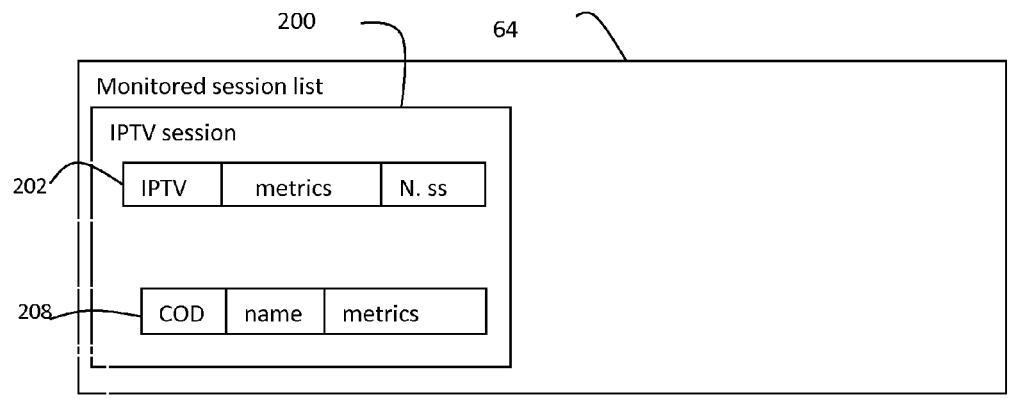
Figure 12D:
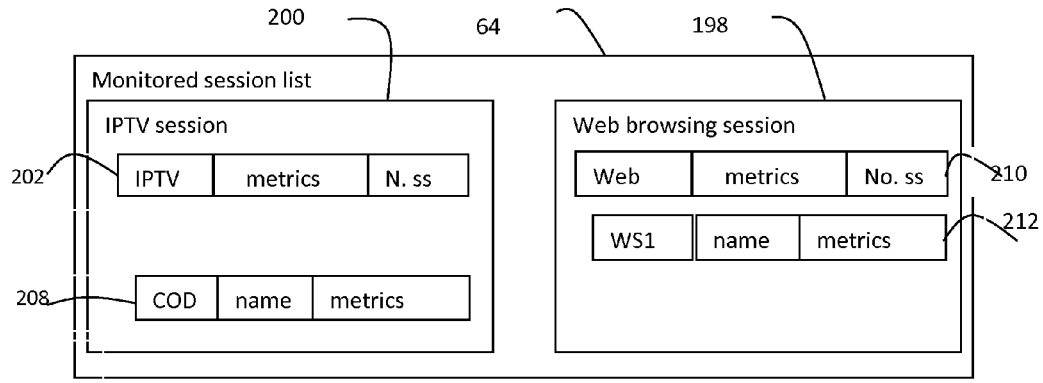
Figure 12E:
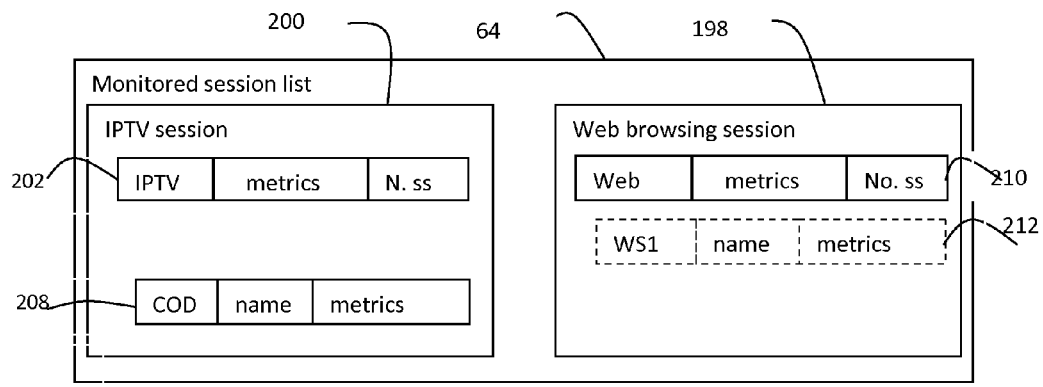
Figure 12F:
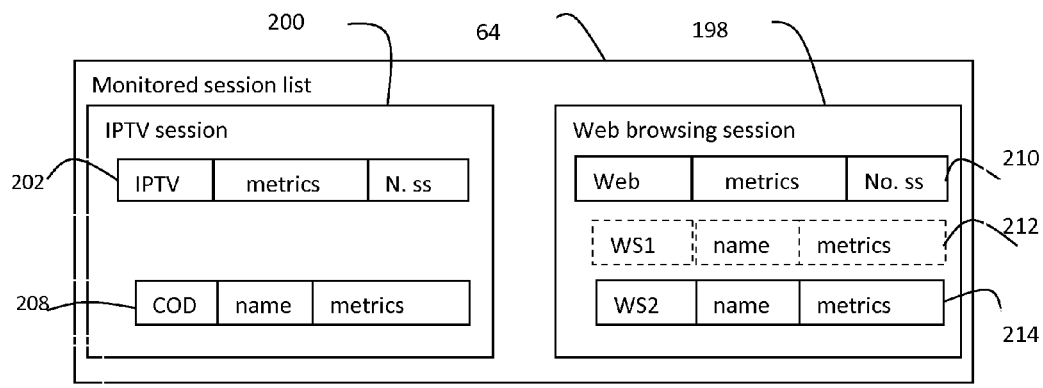
Figure 12G:
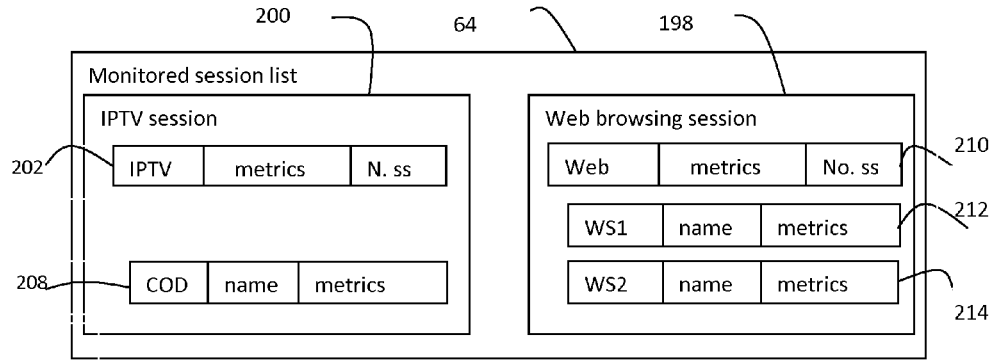
Figure 12H:
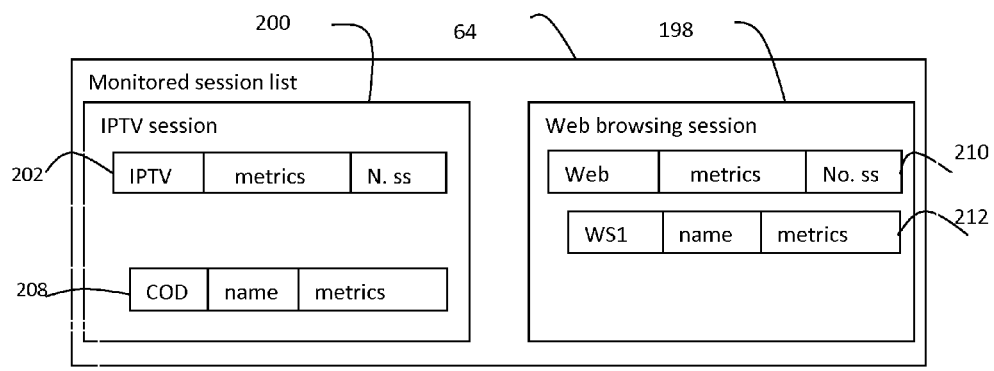
Figure 12I:
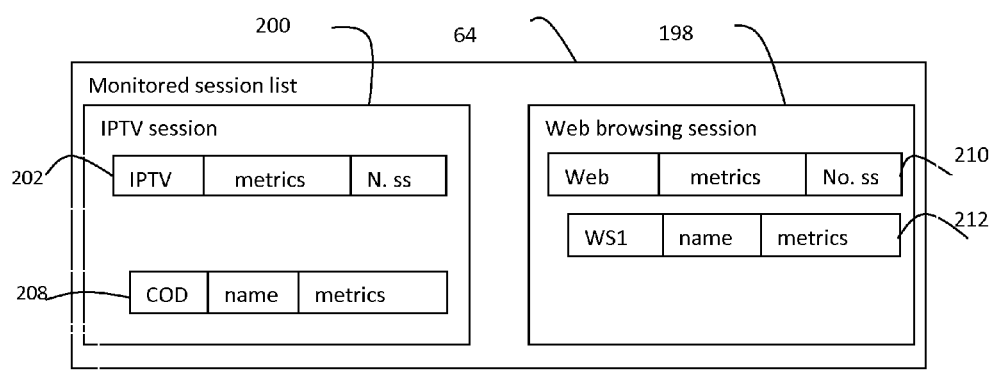
Figure 12J:
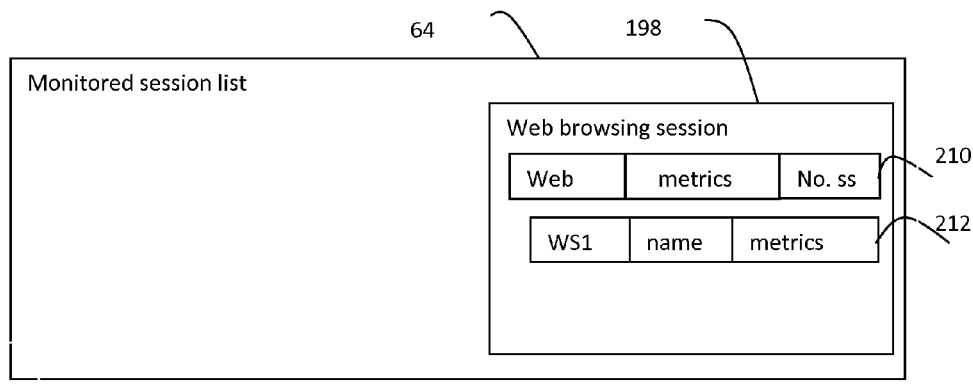
Figure 12K:
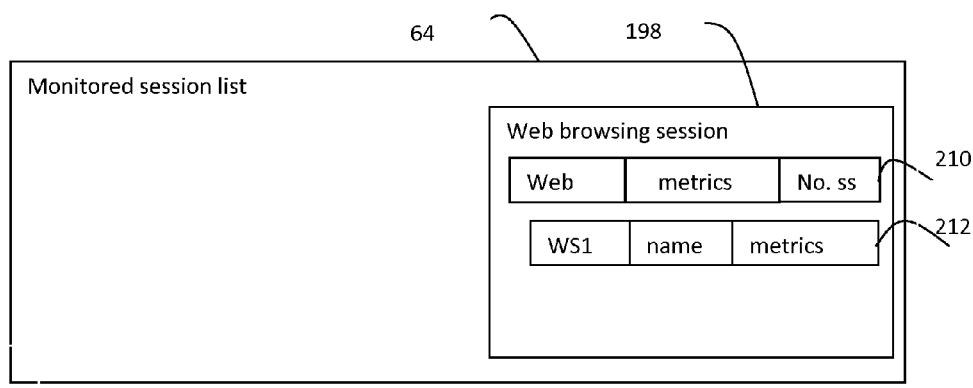
Figure 12L:
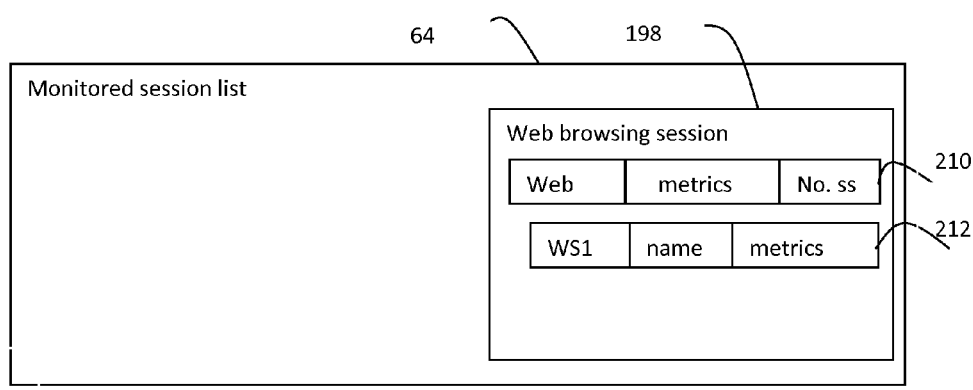
Figure 12M:
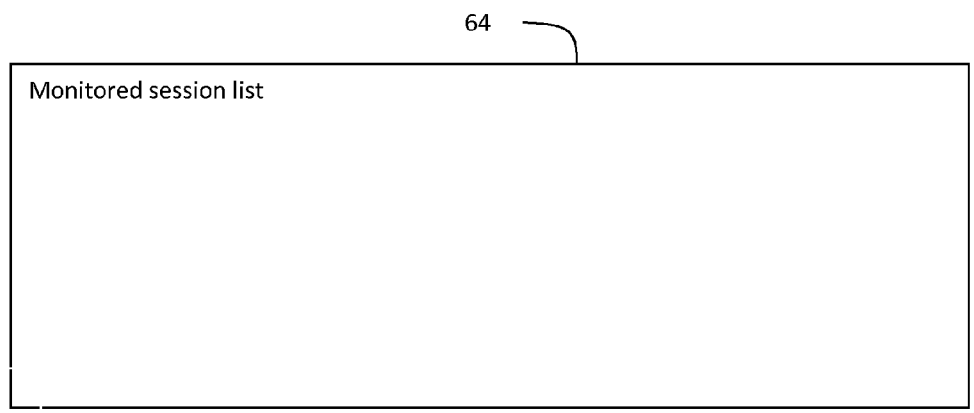

An exemplary method for recording values for service session metrics and sub-service session metrics in accordance with one embodiment is shown in FIG. 11.

This method may be carried out by the create element 90 in the exemplary implementation shown in FIG. 8 for example in steps 112, 132, 140, 144, 148, and 156 of the exemplary method shown in FIG. 9.

FIG. 11 shows an exemplary method for recording metric values for the generic metrics and for all service sessions and sub-service sessions currently being monitored. As described above, in some embodiments it is not necessary to record values for all metrics currently being monitored in all sessions, and therefore steps may be omitted from the method of FIG. 11 as appropriate, as will be appreciated by a skilled person.

In step 182 of FIG. 11, the generic service quality metrics are recorded in generic metric value record 76.

In step 184, the service specific quality metrics are recorded.

In the exemplary implementation shown in FIG. 8, this is achieved by the update element 94 identifying values for the service metrics specified to be monitored for the service from the terminal information 86. The update element 94 obtains the metric values D64 for those metrics from the terminal information 86 and stores the metrics values in service session record 74.

Next it is determined whether the service contains sub-services in step 186. If so, step 186—yes, it is determined whether all the sub-services of the service have been processed in step 188. If all sub-services have not been processed (step 188—no), values for the metrics for a sub-service is recorded in step 190.

In the exemplary implementation, this is achieved by the update element 94 identifying values for the sub-service metrics specified to be monitored for the service from the terminal information 86. The update element 94 obtains the metric values for those metrics from the terminal information 86 and stores the metrics values in service session record 74.

Thereafter control returns to steps 186 and step 188 until all the sub-services of that service are processed.

Once all the sub-services have been processed (step 188—yes) or if the service does not contain sub-services, step 186—no, it is determined whether any other services are to be processed, step 192. If so, control returns to step 184 for recording values for service metrics and sub-service metrics, if applicable, for the further service. Once the service is processed, or all of the services are processed, the metric recording routine finishes.

The operation of the exemplary embodiment implemented as shown in FIGS. 8 and 9 during a sequence of event in which a user accesses monitored IPTV and website services is set out below in order to illustrate the operation of an embodiment in which more than one service is being monitored simultaneously.

The service metric records created in the monitored session list in the exemplary embodiment at event times 1-13 described below are shown with reference to FIGS. 12*a-m*.

During the course of the operation described below, an IPTV service session record 200 and a web service session record 198 are shown in the monitored session list 64.

The IPTV service session record 200 corresponds to the service session record 74 shown in FIG. 8. IPTV service metric record 202, corresponding to the service metric value record 78 shown in FIG. 8, stores values for IPTV service session metrics. TV1 sub-service record 206, corresponding to the sub-service metric value record 80 shown in FIG. 8, stores values for TV1 sub-service session metrics. COD sub-service record 208, corresponding to the sub-service metric value record 80 shown in FIG. 8, stores values for the COD sub-service session metrics.

In the exemplary embodiment the service metrics and sub-service metrics used for the IPTV service session record 200 are as shown in FIG. 5*a*, and therefore will not be explained in more detail.

The web service session record 198 corresponds to the service session record 74 shown in FIG. 8. Web service metric record 210, corresponding to the service metric value record 78 shown in FIG. 8, stores values for web service session metrics. WS 1 sub-service record 212, corresponding to the sub-service metric value record 80 shown in FIG. 8, stores values for WS1 sub-service session metrics. WS2 sub-service record 214, corresponding to the sub-service metric value record 80 shown in FIG. 8, stores values for the WS2 sub-service session metrics.

In the exemplary embodiment the service metrics and sub-service metrics used for the web service session record 198 are as shown in FIG. 5*b*, and therefore will not be explained in more detail.

| Event | Action taken by SQMRM (step numbering as per FIG. 9) | Report message |
|---|---|---|
| 1. Receive message instructing monitoring of IPTV service and web browsing service | Store, step 104, IPTV metric parameters and web browsing metric parameter in parameter memory.<br>Start monitoring, step 106, for initiation of an IPTV session or a web browsing session | none |
| 2. IPTV session - channel TV1 starts | 108 - new IPTV service session start detected<br>110 - add IPTV service session to monitored session list<br>112 & 114 - during IPTV session initiation stage, record values for IPTV metrics for IPTV session in monitored session list<br>116 - send IPTV session start report containing IPTV session initiation stage metric values, once IPTV session initiation stage complete | Send IPTV session start report containing metric values stored during 112 |
| | 118 - TV1 sub-service session detected<br>130 - add TV1 sub-service session to IPTV session in monitored session list<br>132 & 134 - during TV1 session initiation stage, record values for TV1 metrics for TV1 sub-service session in monitored session list<br>136 - send IPTV service session update report containing TV1 sub-service session initiation stage metric values, once TV1 session initiation stage complete | Send IPTV session update report containing metric values stored during 132 |
| 3 change from TV1 to Content On Demand | 126 - TV1 sub-service session termination event detected<br>148 & 150 - during TV1 session termination stage, record values for TV1 metrics for TV1 sub-service session in monitored session list<br>152 - send IPTV service session update report containing TV1 sub-service session termination stage metric values, once TV1 session termination stage complete<br>[154 - delete TV1 sub-service session from monitored session list] | Send IPTV session update report containing metric values stored during 148 |
| | 118 - COD sub-service session detected<br>130 - add COD sub-service session to IPTV session in monitored session list<br>132 & 134 - during COD session initiation stage, record values for COD metrics for COD sub-service session in monitored session list<br>136 - send IPTV service session update report containing COD sub-service session initiation stage metric values, once COD session initiation stage complete | Send IPTV session update report containing metric values stored during 132 |
| 4 website advertisement: open web browser to web site WS1 | 108 - yes, new web service session start detected<br>110 - add web service session to monitored session list<br>112 & 114 - during web service session initiation stage, record values for web service metrics for web session in monitored session list<br>116 - send web service session start report containing web service session initiation stage metric values, once web service session initiation stage complete<br>118 - WS1 sub-service session detected | Send web service session start report containing metric values stored during 112<br>Send web service session |

| Event | Action taken by SQMRM (step numbering as per FIG. 9) | Report message |
|---|---|---|
| | 130 - add WS1 sub-service session to web service session in monitored session list<br>132 & 134 - during WS1 session initiation stage, record values for WS1 metrics for WS1 sub-service session in monitored session list<br>136 - send web service session update report containing WS1 sub-service session initiation stage metric values, once WS1 session initiation stage complete | update report containing metric values stored during 132 |
| 5 Close web site 1 | 126 - WS1 sub-service session termination event detected<br>148 & 150 - during WS1 session termination stage, record values for WS1 metrics for WS1 sub-service session in monitored session list<br>152 - send web service session update report containing WS1 sub-service session termination stage metric values, once WS1 session termination stage complete<br>154 - de-activate WS1 sub-service session in monitored session list | Send web service session update report containing metric values stored during 148 |
| 6 Check prices by opening another web site 2 | 118 - WS2 sub-service session detected<br>130 - add WS2 sub-service session to web service session in monitored session list<br>132 & 134 - during WS2 session initiation stage, record values for WS2 metrics for WS2 sub-service session in monitored session list<br>136 - send web service session update report containing WS2 sub-service session initiation stage metric values, once WS2 session initiation stage complete | Send web service session update report containing metric values stored during 132 |
| 7. Open web site 1 again | 118 - WS1 sub-service session detected<br>130 - re-activate WS1 sub-service session in web service session in monitored session list<br>132 & 134 - during WS1 session initiation stage, record values for WS1 metrics for WS1 sub-service session in monitored session list<br>136 - send web service session update report containing WS1 sub-service session initiation stage metric values, once WS1 session initiation stage complete | Send web service session update report containing metric values stored during 132 |
| 8. Close web site 2 | 126 - WS2 sub-service session termination event detected<br>148 & 150 - during WS2 session termination stage, record values for WS2 metrics for WS2 sub-service session in monitored session list<br>152 - send web service session update report containing WS2 sub-service session termination stage metric values, once WS2 session termination stage complete<br>154 - delete WS2 sub-service session in monitored session list | Send web service session update report containing metrics stored in 148 |
| 9. End of wait period iptv service monitoring | 120 - expiry of periodic monitoring wait period for IPTV service<br>138 - reset IPTV service wait counter.<br>140 - record metric values for IPTV service session and COD sub-service session in monitored session list<br>142 - send IPTV service session update report containing metric values for IPTV service session and COD sub-service session | Send IPTV service session update report containing metrics stored in 140 |
| 10. film ends, close COD sub-service session and IPTV | 126 - COD sub-service session termination event detected<br>148 & 150 - during COD sub-service session termination stage, record values for COD metrics for COD sub-service session in monitored session list<br>152 - send IPTV service session update report containing COD sub-service session termination stage metric values, once COD session termination stage complete<br>154 - de-activate COD sub-service session in monitored session list<br>128 - IPTV service session termination event detected<br>156 & 158 - during IPTV service session termination stage, record values for metrics for IPTV service session in monitored session list<br>160 - send IPTV service session termination report containing IPTV service session termination stage metric values, once IPTV service session termination stage complete<br>162 - remove IPTV service session from monitored session list | Send IPTV service session update report containing metrics stored in 148<br>Send IPTV service session termination report containing metrics stored in 156 |
| 11. WB1 service quality metric drops below threshold | 122 - WB1 sub-service metric value crossing threshold event detected<br>144 - record WB1 sub-service session quality metrics on monitored session list<br>146 - send web service session update report containing WS1 sub-service session metric values | Send web service session update report containing metrics stored in 144 |
| 12. WB1 service quality metric exceeds threshold | 122 - WB1 sub-service metric value crossing threshold event detected<br>144 - record WB1 sub-service session quality metrics on monitored session list<br>146 - send web service session update report containing WS1 sub-service session metric values | Send web service session update report containing metrics stored in 144 |
| 13. close web site WB1 & web service session | 126 - WB1 sub-service session termination event detected<br>148 & 150 - during WB1 session termination stage, record values for WB1 metrics for WB1 sub-service session in monitored session list<br>152 - send web service session update report containing WB1 sub-service session termination stage metric values, once WB1 session termination stage complete | Send web service session update report containing metrics stored in 148 |

| Event | Action taken by SQMRM (step numbering as per FIG. 9) | Report message |
|---|---|---|
| | 154 - delete WB1 sub-service session in monitored session list<br>128 - web service session termination event detected<br>156 & 158 - during web service session termination stage, record values for metrics for web service session in monitored session list<br>160 - send web service session termination report containing web service session termination stage metric values, once web service session termination stage complete<br>162 - remove web service session from monitored session list | Send web service session termination report containing metrics stored in 156 |

In some embodiments the service quality monitoring and reporting module (SQMRM) 12 is not located with or in the terminal 10 but instead is located in another network node. The service quality monitoring and reporting module (SQMRM) 12 in this situation acts as a proxy or as an agent in monitoring service activity in the terminal.

Figure 13:
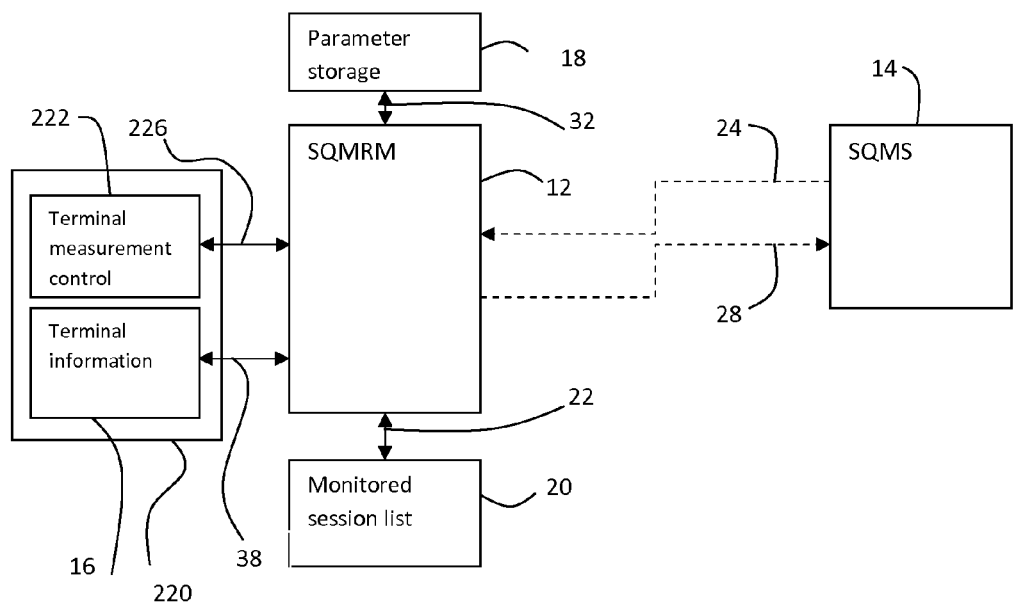
FIG. 13 is an outline block diagram illustrating an exemplary service quality monitoring and reporting module.

FIG. 13 shows an outline block diagram illustrating a service quality monitoring and reporting module (SQMRM) acting as a proxy or as an agent. Elements that are the same as elements in FIG. 2 have been given the same reference numerals.

As can be seen in FIG. 13, the service quality monitoring and reporting module (SQMRM) 12 is not located in the terminal 220 In this case, the service quality monitoring and reporting module (SQMRM) 12 acts as an agent handling service quality reporting for the terminal 220.

The service quality monitoring and reporting module (SQMRM) 12 may be located in another network node and may be used to perform service quality monitoring for a number of different terminals, and/or for a number of different services on the different terminals. For example, in one embodiment a service quality monitoring and reporting module (SQMRM) 12 running in a home gateway may act as an agent for all computers or other terminals within a home area network.

In embodiments where the terminals support a different method of service quality reporting, the service quality monitoring and reporting module (SQMRM) 12 acts as an agent to translate requests to that method and to translate reports from that method.

In some embodiments, the terminals may not support service quality reporting, the service quality monitoring and reporting module (SQMRM) 12 implement service quality reporting using methods such as packet inspection.

As described above with reference to the arrangement shown in FIG. 2, the Service Quality Monitoring and Reporting Module (SQMRM) 12 is also provided with a metric parameter storage 18, for storing generic metric parameters and for storing service metric parameters for the or each service that the Service Quality Monitoring and Reporting Module (SQMRM) 12 has received instructions to monitor. The Service Quality Monitoring and Reporting Module (SQMRM) 12 is also provided with a monitored session list storage 20, for storing a monitored session list identifying all active sessions of services for which monitoring instructions have been received by the Service Quality Monitoring and Reporting Module (SQMRM) 12. In some embodiments, the metric parameter storage 18 and the monitored session list storage 20 may be part of the memory of the node to which the Service Quality Monitoring and Reporting Module (SQMRM) 12 is attached, while in other embodiments the Service Quality Monitoring and Reporting Module (SQMRM) 12 may be provided with its own memory.

In the exemplary embodiment the Service Quality Monitoring and Reporting Module (SQMRM) 12 is coupled directly or indirectly via other network elements (not shown) to a Service Quality Management System (SQMS) 14 to receive a monitoring instruction message 24. The Service Quality Monitoring and Reporting Module (SQMRM) 12 is also coupled directly or indirectly via other network elements (not shown) to the Service Quality Management System (SQMS) 14 to return quality report message 28 to the Service Quality Management System (SQMS) 14.

The terminal 220 in the embodiment shown in FIG. 13 is provided with a terminal measurement control element 222 as well as the terminal information store 16. The service quality monitoring and reporting module (SQMRM) 12 is coupled to send monitoring instructions and to receive measurement reports from the terminal measurement control function 222 of the terminal 220. The service quality monitoring and reporting module (SQMRM) 12 is also coupled to order terminal information from the terminal information store 16 and to receive terminal information from the terminal information store 16.

Figure 14:
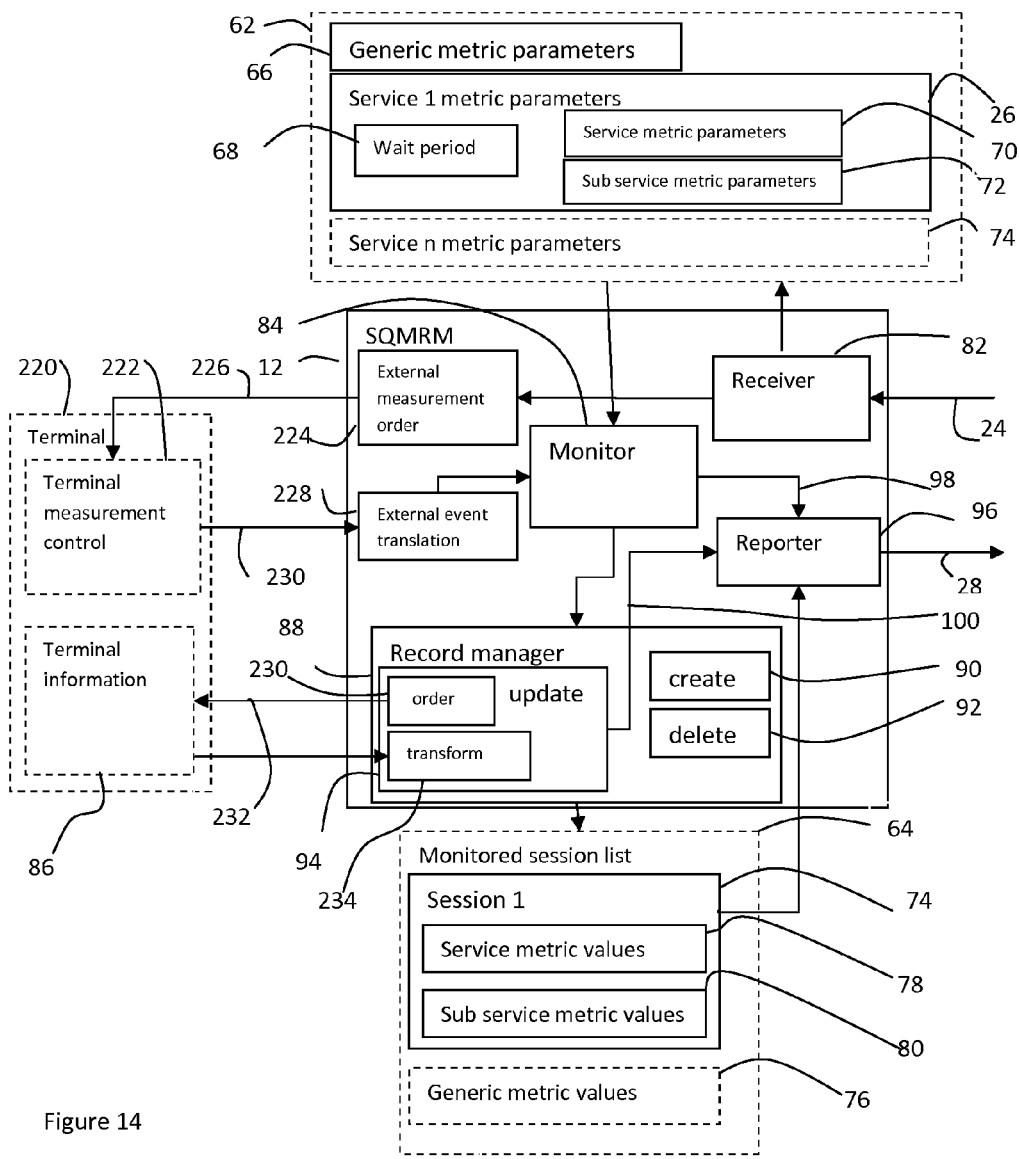
FIG. 14 is a more detailed block diagram illustrating the service quality monitoring and reporting module.

FIG. 14 shows a more detailed block diagram illustrating a service quality monitoring and reporting module (SQMRM) 12 for a terminal 220 operating a different quality monitoring system.

In this embodiment, elements that are the same as or similar to elements in the service quality monitoring and reporting module (SQMRM) 12 shown in FIG. 8 have been given the same reference numerals, and will not be described in more detail with respect to the embodiment shown in FIG. 14.

The service quality monitoring and reporting module (SQMRM) 12 is provided with an external measurement order element 224, which is coupled to the receiver module 82 and to the terminal measurement control element 222. The external measurement order element 224 is operable to generate a monitoring instruction message 226 suitable for requesting service quality monitoring from the terminal measurement control element 222.

The service quality monitoring and reporting module (SQMRM) 12 is provided with an external event translation element 228, which is coupled to the terminal measurement control element 222 and the monitor module 84. The external event translation element 228 is operable to receive session event information 230 or other information from the terminal measurement control element 222, and to translate the received event information for monitor module 84.

The update element 94 of the record manager 88 of the service quality monitoring and reporting module (SQMRM) 12 is provided with a terminal information order element 230, which is operable to generate a request 232 for terminal information 86 from terminal information store and a terminal information transform element 234, which is operable to receive terminal information 86 from terminal information store 16 and transform it so as to be suitable for storing in the monitored session list 64.

The remaining elements operate in the same manner as described above with reference to FIG. 8.

The division of the functions performed within the Service Quality Monitoring and Reporting Module (SQMRM) 12 into the functional modules in FIG. 14 and the details of the connections between the modules described herein should be understood to be merely illustrative. As will be apparent to a skilled person it is possible to implement the functionality described in many different ways, and all such variations are intended to be encompassed within the scope of the present invention.

In particular, the functional modules shown within the Service Quality Monitoring and Reporting Module (SQMRM) 12 in FIG. 14 may be implemented in a computer software program running on a suitable processing device, in which the program flow and/or sub-routine calls may provide the described functionality without explicit couplings between the sub-routines.

In some arrangements the report messages sent from the monitoring entity may be enhanced by intermediate nodes, as illustrated by the arrangement shown in FIG. 14. This may be particularly useful in embodiments in which terminals do not support service metrics, or in embodiments where terminals do not have access to information that might be requested in the monitoring reports. For example, terminals may not have access to location information or subscriber identity information in some embodiments.

Figure 15:
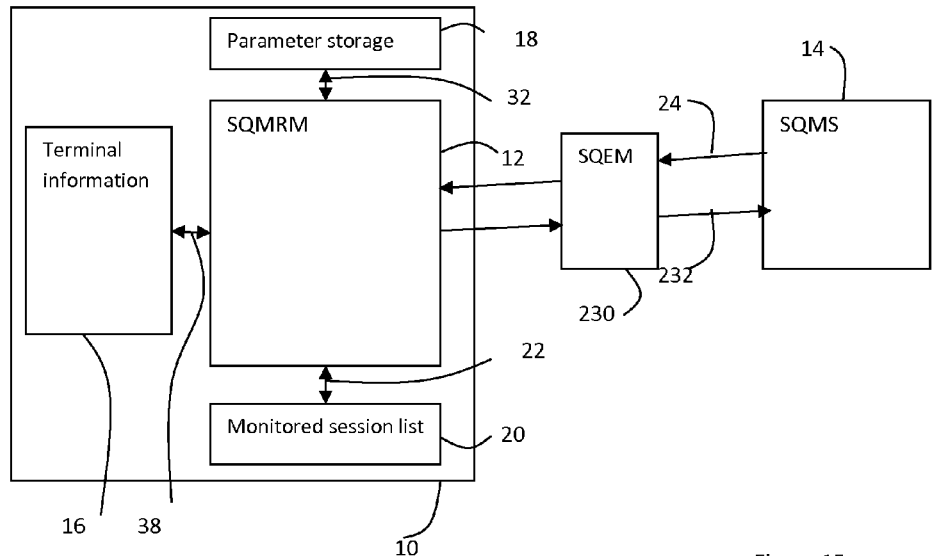
FIG. 15 is a schematic diagram showing a network arrangement of a further embodiment of the service quality enhancement module.

The arrangement shown in FIG. 15 generally corresponds to the arrangement shown in FIG. 2. The same or similar elements have been given the same reference numerals, and will not be described further. As will be apparent to a skilled person, although FIG. 15 shows an arrangement based on the arrangement shown in FIG. 2, corresponding embodiments implemented in the arrangement shown in FIG. 13 would also be possible.

A Service Quality Enhancement Module (SQEM) 230 is provided that is operable to enhance monitoring report messages 28. The service Quality Enhancement Module (SQEM) 230 is arranged to receive and forward monitoring instruction messages 24 being sent to the service quality monitoring and reporting module (SQMRM) 12 from the Service Quality management System (SQMS) 14. The service Quality Enhancement Module (SQEM) 230 is arranged to intercept returning monitoring report messages 28 and add any requested information that is available to the service Quality Enhancement Module (SQEM) 230 but that is missing from the monitoring report message 28, before forwarding the enhanced monitoring report message 232 to the Service Quality management System (SQMS) 14.

In some embodiments the Service Quality Enhancement Module (SQEM) 230 may run on a node such as an Auto-Configuration Server (ACS) and may have information on the subscriber that is using a terminal, or on the geographical location of the terminal.

In some embodiments the Service Quality Enhancement Module (SQEM) 230 may be implemented in the same node as, or as part of, the service quality monitoring and reporting module (SQMRM) 12 acting as a proxy or agent as shown in FIGS. 13 and 14.

Figure 16:
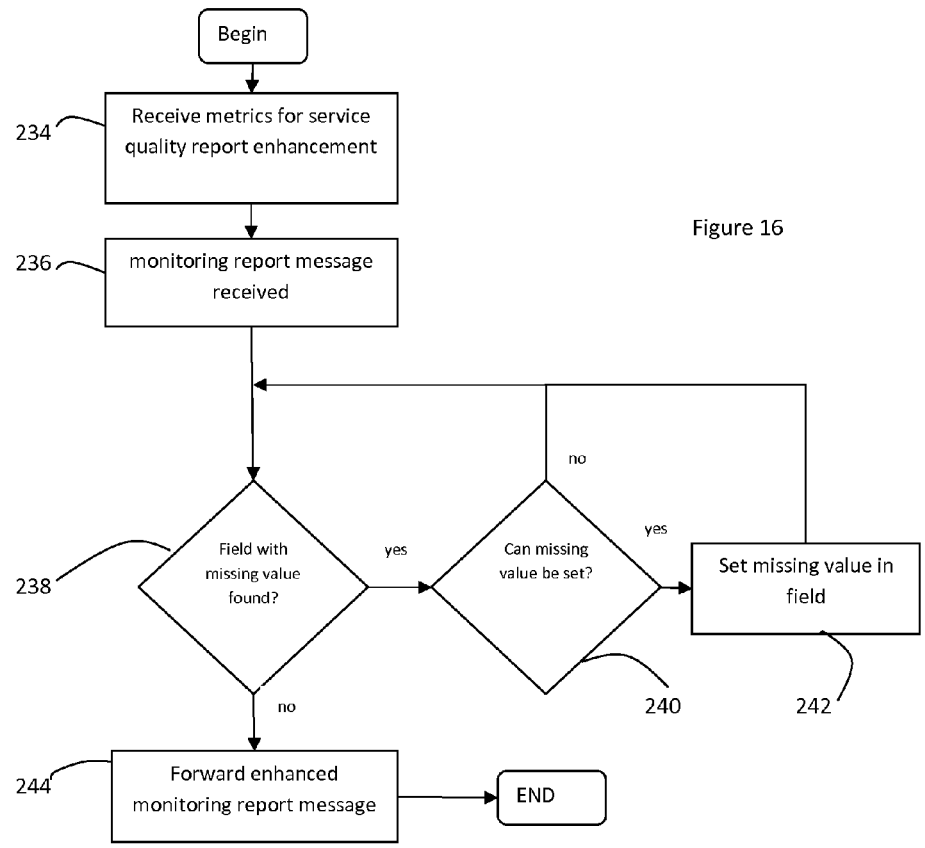
FIG. 16 is a flow chart showing a method of monitoring report message enhancement in accordance with one embodiment.

A method of monitoring report message enhancement in accordance with one embodiment is shown in FIG. 16.

In a first step, step 234, the Service Quality Enhancement Module (SQEM) 230 receives generic parameters and the service quality parameters from the Service Quality management System (SQMS) 14 in the monitoring instruction message 24.

The Service Quality Enhancement Module (SQEM) 230 then waits for a monitoring report message 28 to arrive in a second step, step 236.

In a third step, step 238, the Service Quality Enhancement Module (SQEM) 230 examines the fields in the report to determine whether a field having a missing value is present, based on the parameters in the monitoring instruction message 24 received in step 234.

If a field having a missing value is present, step 238—yes, in a fourth step 240 the Service Quality Enhancement Module (SQEM) 230 whether the Service Quality Enhancement Module (SQEM) 230 has the information to set that field. If so, step 240—yes, the Service Quality Enhancement Module (SQEM) 230 sets the missing value in the field in step 242.

Thereafter step 238, step 240 and if possible step 242 are repeated until all fields with missing values have been identified and considered. Once all fields with missing values have been found, step 238—no, the enhanced monitoring report message 232 can be forwarded on to another Service Quality Enhancement Module (SQEM) 230 or to the Service Quality management System (SQMS) 14 in step 244.

As will be apparent to a skilled person, the principles of the method described herein may be implemented in many different ways. In particular, in some arrangements the identified missing values may be added in a single update step after all the missing fields have been identified.

In exemplary implementation of a Service Quality Enhancement Module (SQEM) 230 will now be described with reference to FIG. 17.

The Service Quality Enhancement Module (SQEM) 230 is provided with:
- a metric parameter store 250, for storing metric parameters for services;
- a data store 252 for storing data relevant to terminals, subscribers or services; and
- a report store 254 for storing the monitoring report message 28.

These three stores are shown as part of the Service Quality Enhancement Module (SQEM) 230 in the exemplary embodiment. However, in some embodiments these data stores may be provided in the host node to which the Service Quality Enhancement Module (SQEM) 230 is attached, and the Service Quality Enhancement Module (SQEM) 230 merely needs to have access to these data stores.

Figure 17:
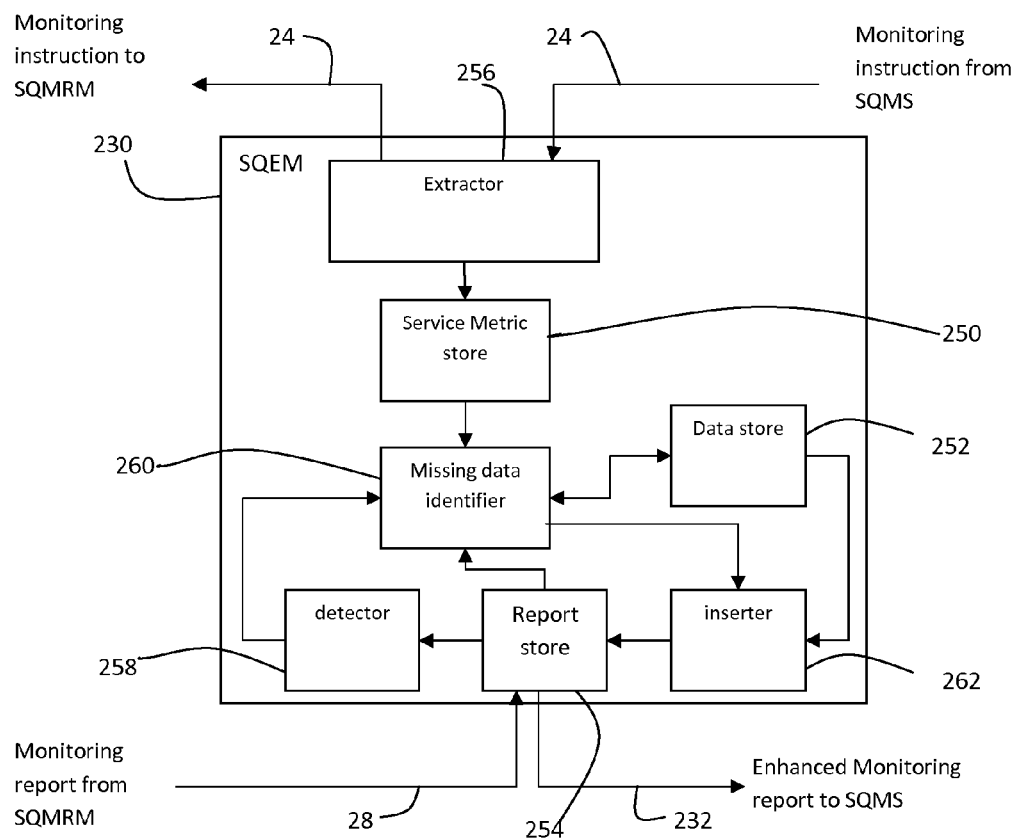
FIG. 17 is a schematic diagram showing an exemplary embodiment of a service quality enhancement module.

Although not shown in FIG. 17, data relating to terminals, subscribers or services which may be useful stored in data store 252 must be updated periodically, as will be apparent to a skilled person. In some embodiments this information will be updated as part of the normal operation of the node to which the Service Quality Enhancement Module (SQEM) 230 is attached.

The Service Quality Enhancement Module (SQEM) 230 has an extractor element 256, which is arranged to receive a monitoring instruction message 24 being sent from a Service Quality management System (SQMS) 14 to a service quality monitoring and reporting module (SQMRM) 12. The extractor element 256 extracts the parameters for service quality enhancement from the monitoring instruction message 24 and stores the extracted parameters in the metric parameter store 250. The extractor element 256 then forwards the monitoring instruction message 24 on towards the service quality monitoring and reporting module (SQMRM) 12.

Monitoring report messages 28 being sent from the service quality monitoring and reporting module (SQMRM) 12 to the Service Quality management System (SQMS) 14 are stored in the report store 254 as they pass through the network node to which the Service Quality Enhancement Module (SQEM) 230 is attached.

A detector element 258 is provided to monitor the report store 254 and detect the arrival of a monitoring report message 28, as in step 236 of the method of FIG. 16.

A missing data identification element 260 is coupled to the detector element 258 to receive notification of a monitoring report message 28. The missing data identification element 260 is coupled to the report store 254 to access the stored monitoring report message 28 for a service, and is coupled to the metric parameter store 252 to access the stored parameters for that service. The missing data identification element 260 examines the fields in the monitoring report message 28 to determine whether a field having a missing value is present, based on the parameters in the monitoring instruction message 24 received in step 234.

The service quality monitoring and reporting module (SQMRM) 12 is also provided with an inserter element 262, which is coupled to receive data from the data store 252. The inserter element 262 is also coupled to the report store 254, in which the monitoring report message 28 is stored. The inserter element 262 is also coupled to receive insertion instructions from the missing data identification element 260.

The missing data identification element 260 is also coupled to the data store 252. For each field of the monitoring report message having a missing value, the missing data identification element 260 determines whether the data store has the required information to add to that field. If so, the missing data identification element 260 instructs inserter element 262 to insert the appropriate data from the data store 252 into the respective field within the stored monitoring report message 28 to form an enhanced monitoring report message 232.

Once all fields with available missing values have been updated, the enhanced monitoring report message 232 can be forwarded on to another Service Quality Enhancement Module (SQEM) 230 or to the Service Quality management System (SQMS) 14.

The division of the functions performed within the Service Quality Enhancement Module (SQEM) 230 into the illustrated functional modules, and the details of the connections between the modules described herein, should be understood to be merely illustrative. As will be apparent to a skilled person, it is possible to implement the functionality described in many different ways, and all such variations are intended to be encompassed within the scope of the present invention.

In particular, the functional modules shown within the Service Quality Enhancement Module (SQEM) 230 in FIG. 17 may be implemented in a computer software program running on a suitable processing device, in which the program flow and/or sub-routine calls may provide the described functionality without explicit couplings between the sub-routines.

Figure 18:
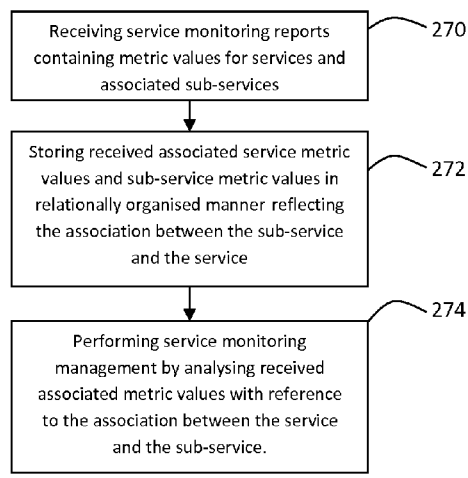
FIG. 18 is a flow chart showing a method of operation of the service quality management system shown in FIG. 17.

The Service Quality management System (SQMS) 14 will now be described with reference to FIGS. 17 and 18.

In the exemplary embodiment the Service Quality management System (SQMS) 14 both requests monitoring of the service by issuing a service monitoring instruction message 24 to the service quality monitoring and reporting module (SQMRM) 12 and receives the resulting monitoring report messages from the service quality monitoring and reporting module (SQMRM) 12. However, as discussed above, it is not necessary in all embodiments that the entity instructing the monitoring is the same as the entity receiving the monitoring reports. Thus the exemplary method as described below, the preliminary steps of creating and sending a suitable service monitoring instruction message 24 are omitted.

A method of operation of the service quality management system (SQMS) 14 will be described with reference to FIG. 18.

In step 272, service monitoring report messages 24 containing metric values for services and associated sub-services, in which the metric values for services and sub-services are relationally organised to reflect the association between the sub-service and the service, are received.

In step 274 the service metric values and sub-service metric values are stored in a relationally organised manner reflecting the association between the sub-service and the service.

In step 276 service monitoring management is performed by analysing the received service monitoring metric values and sub-service monitoring metric values with reference to the association between the service and the sub-service.

An exemplary implementation of a Service Quality management System (SQMS) 14 will now be described with reference to FIG. 19.

The exemplary embodiment of a Service Quality management System (SQMS) 14 is provided with a service metric value store 280 for storing the service monitoring metric values relating to the operation of a monitored service.

A monitoring report receiver 282 is provided and is coupled to receive monitoring report messages, or enhanced monitoring report messages 232. The monitoring report receiver 282 is operable to extract service monitoring metric values from the monitoring report messages, or enhanced monitoring report messages 232.

A metric values storing element 284 is provided. The metric values storing element 284 is coupled to the monitoring report receiver 282 and to the service metric value store 280 and is operable to store the received associated service metric values and sub-service metric values in the service metric value store 280 in a relationally organised manner reflecting the association between the sub-service and the service.

In the exemplary embodiment shown in FIG. 19 metric values resulting from the operation of the exemplary embodiment described with reference to FIG. 11 are shown as stored in the service metric value store 280.

In the exemplary arrangement shown in FIG. 19 a first session record 286 is used for the IPTV service session, and a second session record 288 is used for the web service session that were described with reference to FIG. 11.

The service metric values are denoted SM–n in both cases, where the number n denotes the nth set of service metric values received in that session. The sub-service metric values are denoted SSmMn in both cases, where the number m denotes the sub-service to which the metrics relate, and the number n denotes the nth set of metric values for that sub-service received in that session.

Figure 19:
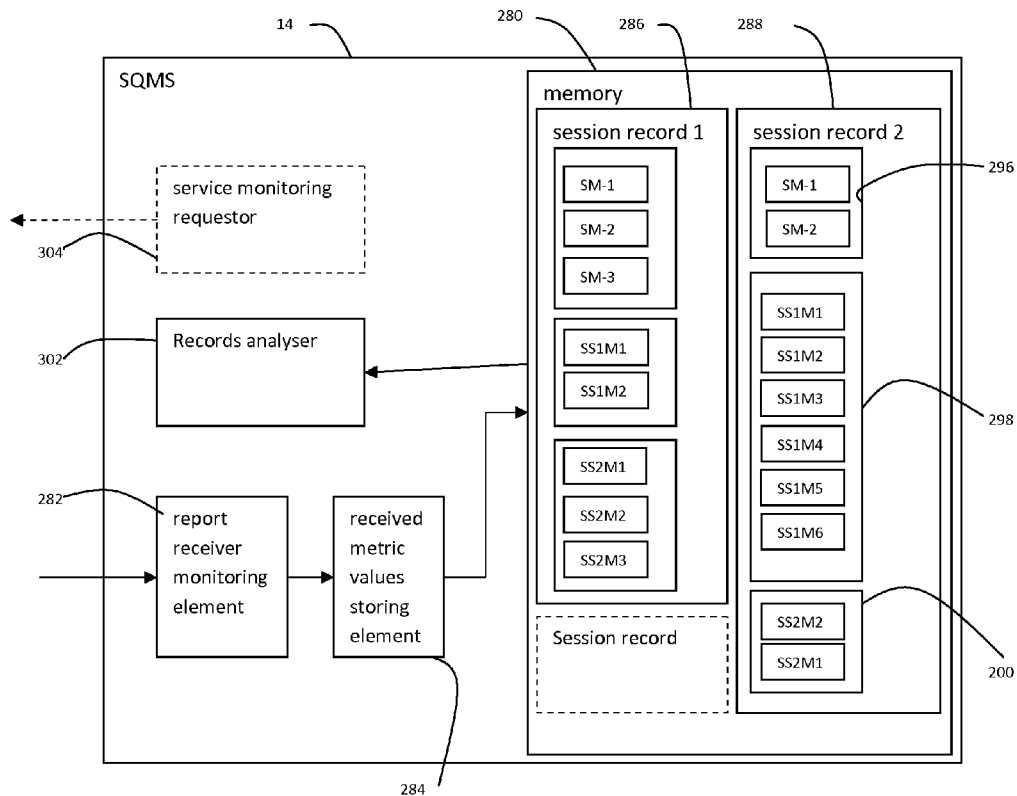
FIG. 19 is a more detailed schematic diagram showing an exemplary implementation of the service quality enhancement module.

As can clearly be seen in FIG. 19, the received metric values are stored in the service metric value store 280 in a relationally organised manner reflecting the association between the sub-service and the service. For the exemplary web service session 288:

received service metric values are stored in a service metric record 296;

received sub-service 1 metric values are stored in a first sub-service metric record 298; and received sub-service 2 metric values are stored in a second sub-service metric record 300.

A similar arrangement is shown also for the IPTV service session record 286 as will be understood from a consideration of FIG. 19, but labelling of the different metric and sub-metric records has been omitted for clarity.

In addition, in some embodiments service metric values and sub-service metric values may be stored in a relationally organised manner based on service session stages.

In some embodiments, the service metric value store 280 may be implemented as a relational database, which enables the relationships between different sets of data easy to manage and analyse.

A records analyser 302 is also provided and is operable to access service metric value store 280 to a perform service monitoring management by analysing the metric values with reference to the relationship between services and sub-services.

Finally, for completeness a service monitoring requestor 304 is shown, which is operable to create and send a monitoring instruction message 24.

From the above description it can be seen that embodiments of the invention provide a new method of and apparatus for service monitoring and a method of and device for service monitoring management. Embodiments may provide one or more of the following advantages:

A generic service monitoring solution applicable to networking technology and terminal type.

A standard reporting mechanism, message structure, and generic parameters for any technology and service, allowing services running on different technologies to be compared easily.

Use of session concepts (session start, in-session update and session termination; service sessions and sub service sessions) to organize the reported metrics in terminal reports, which facilitates a generic terminal report solution.

A single software implementation in the Service Quality management System (SQMS can handle reports from any network or terminal type.

The protocol is an application protocol and can be carried on IP or any other protocol, and can be encoded using XML or any other data representation type Flexible monitoring solution as any parameter on any service, sub service nested to any level can be ordered, monitored, and reported A simple time based periodic monitoring regime can be used for most services, sub-services, and metrics. Specific metrics can be monitored more closely with thresholds, ranges, and timeout values.

The concept of nested services and sub-services is very useful for reporting on OTT services such as Youtube, web main, or segments of IPTV sessions where a viewer watches a single channel.

Terminal reports can be enhanced using the Service Quality Enhancement Module (SQEM) to add information to reports that is not available at terminals.

The method lends itself to the use of agents and proxies so that reports generated using other approaches can be translated for use in this method.

Lower overhead than any existing solutions by (1) allowing incremental reports (e.g. session status update reports); and (2) allowing negotiating reporting metrics to remove unnecessary report fields.

More accurate by tuning reporting granularity based on each session stage, e.g. session start, in-session update and session termination.

Facilitate root cause analysis by disclosing the relationships between reported metrics (e.g. service metrics and sub service metrics).

The invention claimed is:

1. A method of service monitoring, comprising the steps of:

receiving a service monitoring request to perform service monitoring of at least one service, and of at least one sub-service associated with the service, in a terminal, wherein for the or each service to be monitored the method comprises the steps of:

monitoring terminal operational information;

recording at least one value for at least one of a service monitoring metric and a sub-service monitoring metric derived from the terminal operational information; and sending one or more service monitoring reports in respect of a service, wherein service monitoring metric values and sub-service monitoring metric values within the or each service monitoring report are relationally organised reflecting the association between the sub-service and the service.

2. The method as claimed in claim 1 wherein the step of recording comprises recording values for service monitoring metrics in a service record for the service monitoring metrics and recording values for sub-service monitoring metrics in a sub-service record associated with the service record.

3. The method as claimed in claim 1 wherein the step of monitoring further comprises the step of determining the occurrence of a service event requiring the update of at least one service metric value or sub-service metric value; and in the step of recording, a value for at least the metric to which the determined session event relates is recorded.

4. The method as claimed in claim 1 wherein service and sub-service monitoring metric parameters are used in the step of monitoring terminal operational information to determine the occurrence of a service event.

5. The method of service monitoring in claim 1, wherein the service monitoring metric values and sub-service monitoring metric values within the or each service monitoring report are formed from a combination of respective measured metric values.

6. The method of service monitoring in claim 1 wherein the service monitoring request defines parameters for measurement of the service monitoring metrics.

7. The method of service monitoring in claim 1 wherein the sub-service monitoring metric values within a service monitoring report relate to a sub-service monitoring metric values recorded during a plurality of sub-service sessions.

8. The method of service monitoring in claim 1 wherein a received metric parameter defines a periodic monitoring wait period, and a service event is detected after expiry of a corresponding wait period.

9. The method of service monitoring in claim 1 wherein a received metric parameter defines a threshold for a metric and a service event is detected after the value of the monitored metric crosses the threshold.

10. The method of service monitoring in claim 1 wherein a service event is detected at the start and/or termination of a service session.

11. The method of service monitoring in claim 1 wherein a service event is detected at the start and/or termination of a sub-service session.

12. The method of service monitoring in claim 1 wherein the step of monitoring terminal operational information includes the step of identifying values for the service monitoring metrics or sub-service monitoring metrics from packet inspection of packets relating to the service.

13. The method of service monitoring in claim 1 wherein the step of recording at least one value for a service monitoring metric and/or a sub-service monitoring metric includes the step of identifying values for the service monitoring metrics and/or sub-service monitoring metrics from packet inspection of packets relating to the service.

14. The method of service monitoring as claimed in claim 1, wherein
   in the step of monitoring, terminal operation information is monitored to determine the occurrence of session events of each of a plurality of stages of a user service session;
   in the step of recording the values for service monitoring metrics for a stage are recorded in response to a session event of that stage; and
   in the step of sending, at least one service monitoring report, containing service monitoring metric values, is sent for each stage of the user service session.

15. The method of service monitoring as claimed in claim 14 wherein the step of monitoring uses packet level terminal operational information to determine the occurrence of session events.

16. The method of service monitoring as claimed in claim 14, wherein in the step of monitoring, different metric parameters may be used in monitoring a service monitoring metric in at least two stages of the user service session.

17. The method of service monitoring as claimed in claim 1, wherein in the step of recording values for service monitoring metrics for a stage are recorded in a session record for that service.

18. The method of service monitoring as claimed in claim 14, wherein the step of recording, the values for service monitoring metrics are recorded for at least two stages of the user service session using a different set of service monitoring metrics.

19. The method of service monitoring as claimed in 14, wherein the step of recording, the recorded values for service monitoring metrics for a stage are derived from a plurality of metric values during the service session stage.

20. The method as claimed in claim 14, wherein the stages of a user service session comprise: a session start stage; a service session delivery stage; and a service session termination stage.

21. The method of service monitoring as claimed in claim 1, further comprising the step of:
   forming a terminal service monitoring request from the received service quality monitoring request to request service monitoring of at least one service in a terminal using terminal service monitoring metrics;
   sending the terminal service monitoring request to a terminal measurement control in the terminal;
   wherein the step of monitoring terminal operational information includes the steps of receiving a service event report from the terminal measurement control; and
   wherein the step of recording metric values comprises a step of sending a request for required terminal information; and recording metric values based on the received terminal information.

22. The method as claimed in claim 21 comprising the steps of:
   comparing requested service monitoring metrics for a service and reported service monitoring metric values in a service monitoring report for that service to identify missing service monitoring metrics that were requested but not reported; and
   determining whether a value for a missing service monitoring metric is available; and
   inserting any available missing service monitoring metric value into the monitoring report message.

23. The method as claimed in claim 22 further comprising the steps of:
   receiving service monitoring metric data for the service; and
   storing the service monitoring metrics for the service in the service monitoring metric store.

24. The method as claimed in claim 23 wherein the step of receiving requested service monitoring metric data for the service comprises the steps of:
   receiving a service monitoring request, containing service monitoring metrics, in respect of the service;
   determining service monitoring metrics for the service from the service monitoring request.

25. A device for service monitoring, comprising:
   a receiver to receive a service monitoring request to perform service monitoring of at least one service, and of at least one sub-service associated with the service, in a terminal;
   a monitor operable to connect with a terminal operational information store and to monitor terminal operational information in the terminal operational information store;
   a record manager coupled to the monitor and to a metrics record and operable to record at least one value for at least one of a service monitoring metric and a sub-service monitoring metric derived from the terminal operational information in the metrics record; and
   a reporter coupled to the metrics record and operable to send one or more service monitoring reports in respect of a service, wherein service monitoring metric values and sub-service monitoring metric values within the or each service monitoring report are relationally organised reflecting the association between the sub-service and the service.

26. The device as claimed in claim 25 further comprising:
   a missing data identifier, being coupled to a metric store containing service monitoring metrics for a service, and coupled to a report store containing a monitoring report message containing reported service monitoring metric values for that service, the missing data identifier being operable to compare service monitoring metrics for a service and reported service monitoring metric values for that service to identify missing service monitoring metrics; and
   a data inserter coupled to the missing data identifier to receive missing service monitoring metric value data and to a data store, the data inserter being operable to insert any available missing service monitoring metric value data identified in the data store into the monitoring report message.

27. The device as claimed in claim 26 wherein the missing data identifier is coupled to the data store and is operable to determine whether a value for the or each of the missing service monitoring metric is available in the data store.

28. The device as claimed in claim 26 wherein the data inserter is operable to determine whether a value for the or each of the missing service monitoring metric is available in the data store.

29. The device as claimed in claim 26 further comprising an extractor, operable to extract service monitoring metric data from a monitoring instruction message for the service and coupled to the service monitoring metric store to store the service monitoring metric data in the service monitoring metric store.

* * * * *